(12) United States Patent
Tahir et al.

(10) Patent No.: US 9,479,222 B2
(45) Date of Patent: Oct. 25, 2016

(54) DYNAMIC MODE SELECTION FOR MIMO POWERLINE DEVICES

(71) Applicant: QUALCOMM Incorporated, San Diego, CA (US)

(72) Inventors: Ehab Tahir, Mississauga (CA); Arun Avudainayagam, Fremont, CA (US); Deniz Rende, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/738,323

(22) Filed: Jun. 12, 2015

(65) Prior Publication Data

US 2016/0028439 A1 Jan. 28, 2016

Related U.S. Application Data

(60) Provisional application No. 62/028,223, filed on Jul. 23, 2014.

(51) Int. Cl.
*H04B 3/54* (2006.01)
*H04B 7/04* (2006.01)
*H04B 7/06* (2006.01)
*H04B 3/487* (2015.01)

(52) U.S. Cl.
CPC .............. *H04B 3/544* (2013.01); *H04B 3/487* (2015.01); *H04B 3/54* (2013.01); *H04B 7/0434* (2013.01); *H04B 7/0617* (2013.01)

(58) Field of Classification Search
CPC .... H04B 3/544; H04B 3/487; H04B 7/0617; H04B 3/54; H04B 7/0434
See application file for complete search history.

(56) References Cited

U.S. PATENT DOCUMENTS

| 8,270,505 B2 | 9/2012 | Stadelmeier et al. |
| 8,553,795 B2 | 10/2013 | Xu et al. |
| 9,020,056 B2 | 4/2015 | Reuven et al. |

(Continued)

FOREIGN PATENT DOCUMENTS

EP 2410665 A2 1/2012

OTHER PUBLICATIONS

International Search Report and Written Opinion, PCT/US2015/035809, dated Aug. 31, 2015, 16 pages.

(Continued)

*Primary Examiner* — Jean B Corrielus
(74) *Attorney, Agent, or Firm* — The Marbury Law Group, PLLC

(57) ABSTRACT

A first communication device can dynamically select a mode of communication (such as a MIMO mode or a SISO mode) to improve throughput. In selecting the communication mode, the first communication device may determine whether a powerline medium effectively supports multi-channel communication. Even when the first communication device and a second communication device both are capable of using a MIMO mode, the first communication device may select a SISO mode if it determines that one of the channels is ill-conditioned for communication. For example, the powerline medium may be affected by a missing conductor, protective circuit, or other attenuation that impairs the second channel differently than the first channel. If the disparity between the first channel and the second channel is greater than a threshold, the first communication device may switch to a SISO mode to improve performance.

53 Claims, 14 Drawing Sheets

(56) References Cited

U.S. PATENT DOCUMENTS

| | | | |
|---|---|---|---|
| 2007/0110176 A1* | 5/2007 | Wu | H04L 1/0006 375/260 |
| 2008/0212652 A1* | 9/2008 | Parker | H04L 27/261 375/133 |
| 2010/0119004 A1 | 5/2010 | Hadad | |
| 2010/0189093 A1* | 7/2010 | Palanki | H04W 52/16 370/344 |
| 2012/0020423 A1* | 1/2012 | Reuven | H04B 3/54 375/260 |
| 2012/0114025 A1* | 5/2012 | Gauthier | H04B 7/0811 375/219 |
| 2013/0215945 A1 | 8/2013 | Eitel et al. | |
| 2013/0259101 A1 | 10/2013 | Earnshaw et al. | |
| 2014/0112400 A1* | 4/2014 | Reuven | H04B 3/56 375/258 |
| 2015/0172036 A1* | 6/2015 | Katar | H04B 3/544 375/257 |
| 2015/0201336 A1* | 7/2015 | Shad | H04W 16/28 455/63.4 |

OTHER PUBLICATIONS

"ITU-T Unified high-speed wireline-based home networking transceivers—Multiple input/multiple output specification—G.9963", Jun. 22, 2012, pp. 1-90, XP055195610, Retrieved from the Internet: URL:https://www.itu.int/rec/T-REC-G.9963-2 01112-l/en [retrieved on Jun. 12, 2015] the whole document.

Yonge L., et al., "An Overview of the HomePlug AV2 Technology", Journal of Electrical and Computer Engineering, vol. 66, No. 1, Jan. 1, 2013, XP055208549, ISSN: 2090-0147, DOI: 10.1109/TCOMM.2010.092810.090447, 22 pages.

* cited by examiner

DYNAMIC MODE SELECTION FOR MIMO POWERLINE DEVICES

CROSS-REFERENCE TO RELATED APPLICATION(S)

This application claims priority to U.S. Provisional Application No. 62/028,223, filed on Jul. 23, 2014, which application is incorporated herein by reference in its entirety.

FIELD OF THE DISCLOSURE

The present application generally relates to the field of communication systems, and, more particularly, to communication devices that may support multiple-input-multiple-output (MIMO) communication via a powerline medium.

DESCRIPTION OF RELATED ART

In a wireline communication system, multiple physical channels may be defined using conductors of a communication medium. For example, a powerline medium may have three conductors (e.g., a line or hot wire (L), a neutral wire (N), and a ground or protective earth wire (G)). A first transmitter (transmit port, or TX port) of a transmitting communication device and a first receiver (receive port, or RX port) of a receiving communication device may communicate via a channel. A path over which a signal is transmitted from a TX port and received at a RX port is referred to as a channel of the communication medium.

A communication system operating in single-input single-output (SISO) mode may utilize a single channel (e.g., LN-LN) for communication. A communication system operating in SISO mode may be referred to as a SISO system. In contrast, a communication system in which signals are simultaneously transmitted and received over multiple channels may be referred to as a MIMO system or operating in MIMO mode. A MIMO system is any system that uses more than one channel. Typically, a powerline MIMO system may use what may be referred to as 2x2 MIMO, where four channels may be defined in relation to the three conductors of the powerline medium.

Often, communication systems using technology for MIMO mode can increase throughput compared to a system operating in SISO mode. Each device operating in MIMO mode can have multiple modes of operation that can be used to communicate with other devices operating in MIMO or SISO modes. Traditionally, devices operating in MIMO mode may communicate with other devices using a MIMO mode, as a MIMO mode often outperforms a SISO mode. However, there may be some scenarios where a MIMO mode underperforms a SISO mode.

SUMMARY

The present disclosure may provide for a communication device that can dynamically select a mode of communication (such as a MIMO mode or a SISO mode) to improve throughput. The selected mode may be based on determining whether a powerline medium supports communication via more than one channel.

A first communication device may comprise a network interface, a processor, and a memory storing instructions. The network interface may be capable of receiving signals via a plurality of channels of a powerline medium between the first communication device and a second communication device. The processor may comprise a mode selection engine.

The memory storing instructions may be a non-transitory machine-readable medium having instructions stored therein. When the instructions are executed by the mode selection engine, the instructions may cause the first communication device to perform various operations. The instructions may cause the first communication device to determine first signal processing values, wherein the first signal processing values are associated with receiving at least a first signal associated with a first subset of the plurality of channels of the powerline medium, and wherein the first subset of the plurality of channels includes a first channel. The instructions may cause the first communication device to determine second signal processing values, wherein the second signal processing values are associated with receiving at least a second signal associated with a second subset of the plurality of channels of the powerline medium, and wherein the second subset of the plurality of channels includes a second channel. The instructions may cause the first communication device to select a receive mode for the first communication device based at least in part on the first signal processing values and the second signal processing values. The receive mode may be selected from a group consisting of a first mode and a second mode, wherein the first mode utilizes one of the first and second channels, and the second mode utilizes both of the first and second channels.

The instructions may cause the first communication device to determine, based on the first mode performance and the second mode performance, whether to use a single-input single-output (SISO) receive mode or a multiple-input multiple-output (MIMO) receive mode.

The present disclosure may provide for methods of communication between a first communication device and a second communication device via a plurality of channels of a powerline medium. Methods may comprise selecting, by the mode selection engine of the first communication device, a receive mode for the first communication device based at least in part on the first signal processing values and the second signal processing values. The receive mode may be selected from the group consisting of a first SISO mode using one of the first and second channels without receiver diversity; a second SISO mode using both of the first and second channels for receiver diversity; a MIMO eigen-beamforming mode using both of the first and second channels; and a MIMO spot-beamforming mode using both of the first and second channels.

BRIEF DESCRIPTION OF THE DRAWINGS

The present embodiments may be better understood, and numerous objects, features, and advantages made apparent to those skilled in the art by referencing the accompanying drawings.

DETAILED DESCRIPTION

Figure 1:
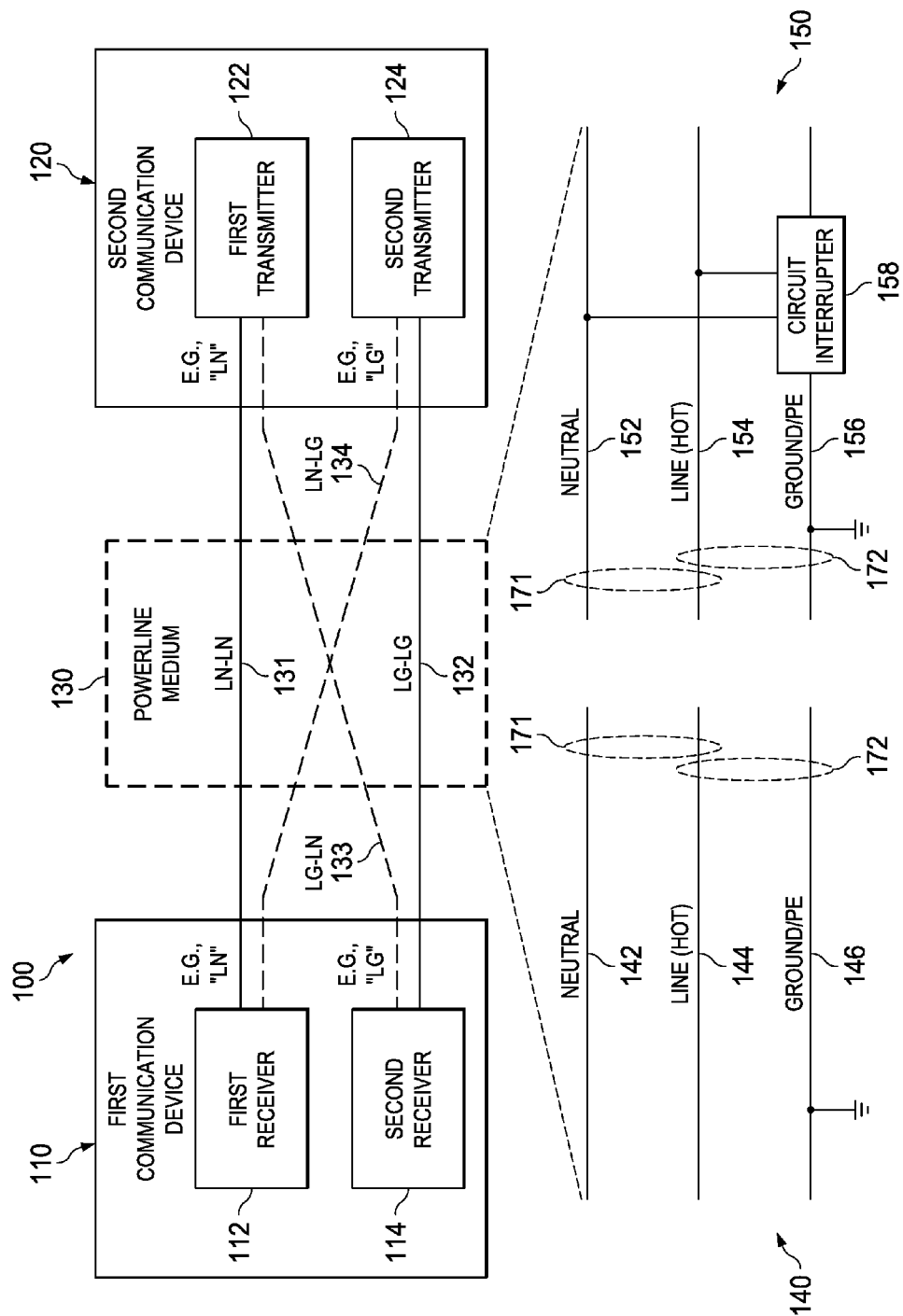
FIG. 1 depicts an example system to introduce concepts of this disclosure.

The description that follows includes exemplary systems, methods, techniques, instruction sequences and computer program products that embody the present subject matter. However, it is understood that the described embodiments may be practiced without these specific details. For instance, although examples may refer to two or four channels, the techniques for selecting a communication mode may be implemented for systems with various quantities of channels. Furthermore, while a typical powerline medium is described in this disclosure, other implementations may use different powerline medium or channel definitions. In addition to powerline medium, the techniques described herein may be used with a different communication medium that is susceptible to having a missing or highly attenuated channel. In other instances, well-known instruction instances, protocols, structures, and techniques have not been shown in detail in order not to obfuscate the description.

In the examples provided in this disclosure, a multichannel communication medium (e.g., a powerline medium) may be associated with two or more channels for signals to be transmitted to a first communication device (e.g., a receiving device) from a second communication device (e.g., a transmitting device). The first communication device may have two receivers (also referred to as receive chains) which may allow the first communication device to support a MIMO mode of communication. However, there may be times when a SISO mode could provide better performance over the MIMO mode. The first communication device can switch from MIMO mode to SISO mode in response to determining a condition of the powerline medium. The SISO mode may outperform the MIMO mode even when both the first communication device and second communication device support MIMO modes of communication.

In accordance with this disclosure, a first communication device can dynamically select a mode of communication (such as a MIMO mode or a SISO mode) to improve throughput. In selecting the communication mode, the first communication device may determine whether a powerline medium effectively supports communication via both of a first channel and a second channel. Even when the first communication device and a second communication device are both capable of using a MIMO mode, the first communication device may select a SISO mode if it is determined that one of the channels may negatively affect or impair a MIMO mode of communication. For example, the powerline medium may be affected by a missing conductor, protective circuit, or other attenuation that impairs the second channel differently than the first channel. If the disparity between the first channel and the second channel is greater than a pre-determined or preset threshold, the first communication device may determine that the impaired channel is not well suited ("ill-conditioned") for use in a MIMO mode. Other terms may be used to refer to the ill-conditioned channel, such as undesirable, unsuitable, unusable, ineffective, faulty, impaired, or defective. An ill-conditioned channel is a channel that has a channel condition that causes the ill-conditioned channel to negatively affect or impair communication in a MIMO mode. When the first communication device detects an ill-conditioned channel, the first communication device may switch to a SISO mode to improve performance. In this disclosure, embodiments of a first communication device may detect an ill-condition channel and, as a result, the communication system may switch to a SISO mode of communication to improve performance over the MIMO mode of communication.

An example scenario in which the SISO mode may outperform the MIMO mode may be when a conductor is missing from the powerline medium. For example, many older homes may not have a ground wire on all of the electrical outlets. The first communication device (or second communication device) may be plugged into an outlet that has no ground wire. The absence of the ground wire may thwart communication via the second channel. Another example scenario in which the SISO mode may outperform the MIMO mode may be when the ground wire is highly attenuated compared with other lines of the powerline medium. If attenuation for a first channel and a second channel are very disparate, the signal processing values used to process the first channel and second channel may result in poor performance. Attenuation for the ground wire may occur when a communication device is coupled via a surge-suppressor or other protective circuitry to the powerline medium. Protective circuits (such as arc-fault interrupt circuit, AFCI, or ground fault interrupt circuit, GFCI) may be integrated with an electrical outlet for safety purposes. However, the protective circuit may asymmetrically change the conductance of one of the lines of a powerline medium. In these example scenarios, a pair of devices in MIMO mode may perform worse than a pair of devices in SISO mode.

FIG. 1 depicts an example system 100 to introduce concepts of this disclosure. The example system 100 may include a first communication device 110 and a second communication device 120 in communication via a powerline medium 130. For a device capable of operating in MIMO mode, the device may have more than one transmitter and/or more than one receiver. The first communication device 110 may include a first receiver 112 and a second receiver 114, which can independently receive signals, noise, and interference. In other example communication devices, more receivers (not shown) may be present. The second communication device 120 may include a first transmitter 122 and a second transmitter 124. In traditional systems, when both the first communication device 110 and the second communication device 120 are devices capable of operating in MIMO modes, they may both operate using MIMO modes of operation.

Traditional powerline communication systems may use a first pair of wires (such as line wire and neutral wire, referred to as "LN") as a first channel to transmit and receive data. For example, a first transmitter (transmit port, or TX port) of a transmitting communication device and a first receiver (receive port, or RX port) of a receiving communication device may be referred to as LN ports when they couple to the line wire and neutral wire of the powerline medium. In the example above, the first channel may be defined as LN-LN, since both the TX port and the RX port use the LN wire pair. For a particular signal, a transmitter initiates the signal at a TX port and a receiver obtains the signal at a RX port. A system operating in SISO mode may utilize just the single channel (e.g., LN-LN) for communication. However, when a third wire (such as the ground (G) or protective-earth wire) is present, additional ports may be created (e.g., LG and NG). Furthermore, systems operating in MIMO mode may take advantage of crosstalk between the pairs of wires. Therefore, some channels may be defined in relation to a first port type on the transmitter and a second port type on the receiver. Typically, four channels may be defined: direct channels LN-LN and LG-LG, and crosstalk channels LN-LG and LG-LN.

FIG. 1 depicts different channels that may be present in a system operating in a MIMO mode. The first receiver 112 may be a "LN" port, meaning it may be coupled to a wire pair 171 that includes the line wire (sometimes also referred to as hot or hot/line) and the neutral wire. The second receiver 114 may be a "LG" port, meaning it may be coupled to a wire pair 172 that includes the line wire and the ground wire. In other systems, other wire pairs may be used. For brevity, this disclosure will simply refer to the LN and LG port types, each of which could comprise different wire pairs. The first transmitter 122 may be capable of generating a first signal to transmit via a first channel 131 (LN-LN) to the first receiver 112. Similar to the first receiver 112 and second receiver 114 of the first communication device 110, the second communication device 120 may have a first transmitter 122 and second transmitter 124. The second transmitter 124 may be capable of generating a second signal to transmit via the second channel 132 (LG-LG) to the second receiver 114.

Between the LN and LG ports, there may be four channels (sometimes also referred to as signal propagation paths). A first channel 131 may span from the first transmitter 122 to the first receiver 112 and may be referred to as an LN-LN channel. A second channel 132 may span from the second transmitter 124 to the second receiver 114 and may be referred to as the LG-LG channel. The LN-LN and LG-LG channels may be direct channels that may use the same wire pairs from a transmitting device to a receiving device. A third channel 133 may propagate a signal from the first transmitter 122 to the second receiver 114, and may be referred to as LN-LG channel. (The first port type refers to the transmitter side port and the second port type refers to the receiver side port.) A fourth channel 134 may propagate a signal from the second transmitter 124 to the first receiver 112, and may be referred to as LG-LN channel. The LN-LG and LG-LN channels may be cross talk channels. The powerline communication system may process a transmit signal so that the cross talk between pairs of wires can be used to convey additional data or for diversity. Therefore, they can be considered different channels. In this disclosure, many examples are described in terms of a first channel and a second channel. However, the techniques are similarly applicable to systems with more than two channels.

Having explained the various channels in FIG. 1, attention is directed to two examples of the powerline medium 130. A first example powerline medium 140 shows the powerline medium having three conductors, the neutral wire 142, the line wire 144, and the ground wire 146. In FIG. 1, the neutral wire 142 and line wire 144 may be used as a wire pair 171 to form a first channel 131. The line wire 144 and ground wire 146 may be used as a wire pair 172 to form a second channel 132. The first example powerline medium 140 may properly support a MIMO mode of communication via the first channel 131 and the second channel 132.

A second example powerline medium 150 illustrates a potential problem which may negatively affect or impair a MIMO mode of communication. The second example powerline medium 150 shows a neutral wire 152, line wire 154, and ground wire 156 are present, and the first channel 131 and second channel 132 use the same wire pairs 171 and 172, respectively, as in the first example powerline medium 140. However, in the second example powerline medium 150, a circuit interrupter 158 may be present in powerline medium in the path between the first communication device 110 and the second communication device 120. The circuit interrupter 158 may be an AFCI, GFCI or another suitable circuit. The circuit interrupter 158 may cause a higher attenuation on the second channel 132 compared to the first channel 131. In some circumstances, if the attenuation on the second channel 132 is significantly higher than that of the first channel 131, throughput for a MIMO mode of communication may be negatively impacted.

The first communication device 110 may measure performance metrics or other channel conditions associated with each of the first channel 131 and the second channel 132 to determine signal-processing values. Signal processing values may refer to automatic gain control (AGC), zero forcing equalizer (ZFE) weights, channel matrix determinants, or beamforming coefficients, signal-to-noise ratio (SNR) measurements, filter settings, or other values which are used to configure the first receiver 112 and the second receiver 114 to process signals received via the first channel 131 and the second channel 132. The signal processing values for each of the receivers may be different in a deployment. In some scenarios, the disparities between first signal processing values for the first receiver 112 and second signal processing values for the second receiver 114 may result in poor performance in a MIMO mode. The first communication device 110 may observe disparities between the signal processing values or the performance metrics to identify an ill-condition channel and dynamically switch from a MIMO mode to a SISO mode.

In this disclosure, a MIMO mode may refer to a communication mode in which different signals are conveyed via both of a first channel and a second channel (or more than two channels). A SISO mode may refer to a communication mode in which signals are conveyed via one channel. In a SISO mode, transmission and reception of a signal may be limited to one channel. However, there may be scenarios in which SISO mode may utilize both receivers 112, 114 of the first communication device 110. In one SISO mode for reception, the first communication device 110 may disable the second receiver 114 and use the first receiver 112 to retrieve the signal. Thus, the signal may be retrieved only with the first receiver 112. This may be referred to as SISO without receiver diversity. In another SISO mode for reception, the first communication device 110 may still use both the first receiver 112 and the second receiver 114 to retrieve the signal using receiver diversity. The first receiver 112 and the second receiver 114 may both detect the signal because of energy leakage or crosstalk. The first communication device 110 may use techniques such as maximal ratio combining (MRC), equal gain combining (EGC), or other diversity combining, to improve reception of the signal. This may be referred to as SISO with receiver diversity.

In some circumstances, circuit interrupter 158 may be highly attenuated. As a result, use of receiver diversity in powerline medium 150 may result in lower performance than use of SISO without receiver diversity. Based on the signal processing values calculated for the SISO with receiver diversity mode, the first communication device 110 may determine that the second channel may be ill-conditioned and may select the SISO mode without receiver diversity to improve performance.

Figure 2:
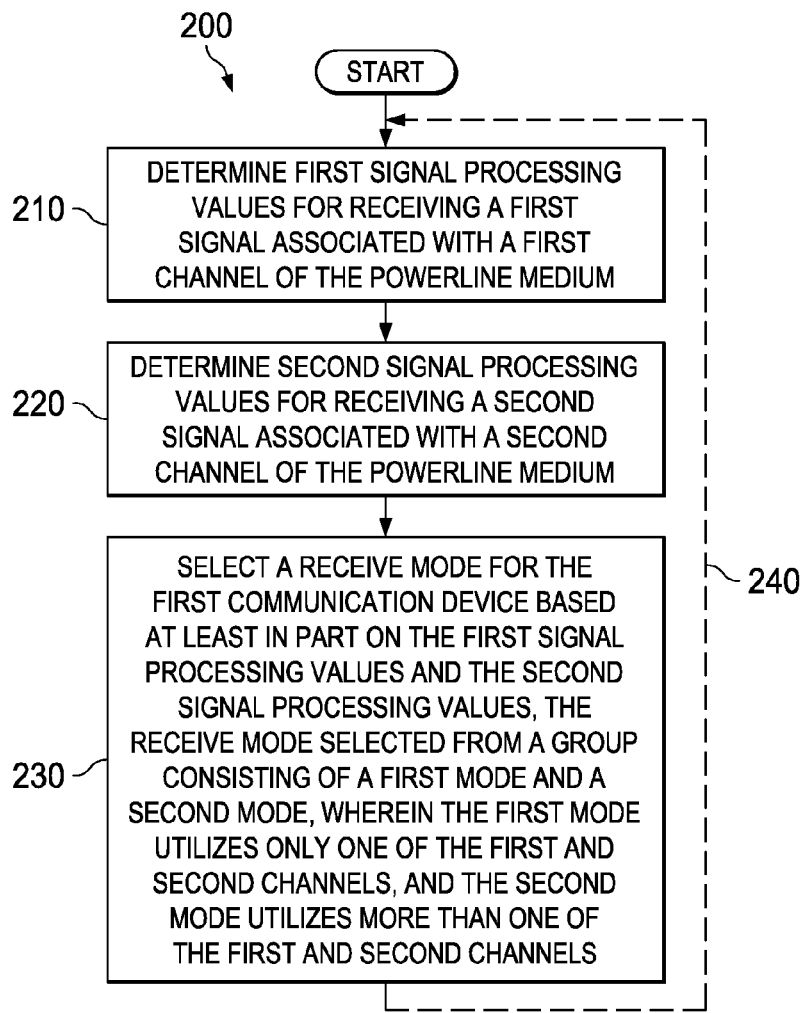
FIG. 2 depicts an example flow diagram in which a receive mode is selected based on signal processing values in accordance with an embodiment of this disclosure.

FIG. 2 depicts an example flow chart 200 for the process in which a receive mode is selected based on signal processing values. The process may be performed by a first communication device capable of receiving signals via a plurality of channels of a powerline medium between the first communication device and a second communication device. For example, the first communication device may have at least a first receiver and a second receiver. At block 210, the first communication device may determine first signal processing values for receiving a first signal associated with a first channel of the powerline medium. At block 220, the first communication device may determine second signal processing values for receiving a second signal associated with a second channel of the powerline medium.

At block 230, the first communication device may select a receive mode for the first communication device based at least in part on the first signal processing values and the second signal processing values, the receive mode selected from a group consisting of a first mode and a second mode, wherein the first mode utilizes one of the first and second channels, and the second mode utilizes more than one of the first and second channels. For example, the second mode may utilize both of the first and second channels. The first communication device may repeat (shown as arrow 240) the operations periodically or in response to a triggering event to select the receive mode based on updated signal processing values.

FIGS. 3A, 3B, 3C and 3D depict various communication modes which may be selected in accordance with embodiments of the present disclosure. In the embodiments of FIGS. 3A-3D, a powerline medium may comprise two direct channels (as previously noted LN-LN, and LG-LG). Due to the cross-coupling between LN and LG, there may be four possible signal propagation paths between the first communication device 310 and the second communication device 320. In other embodiments (not depicted), a receiving device (such as first communication device 310) may utilize more than two receivers. For example, a third wire pair (e.g., Neutral-Ground, NG, not shown) could be defined. A receiver may utilize a third receiver (RX3, not shown) to measure signals associated with the third wire pair (NG). Although a transmitter may inject two transmitted signals (via TX1 and TX2), there may be six propagation paths defined from transmitters TX1 and TX2 to receivers RX1, RX2, and RX3. Additionally, the cross talk between direct channels may result in cross talk channels that can be used to carry signals for MIMO modes. In the interest of clarity, the foregoing descriptions will describe the first communication device 310 as having two receivers, but the embodiments of the present disclosure are not limited to such.

Figure 3A:
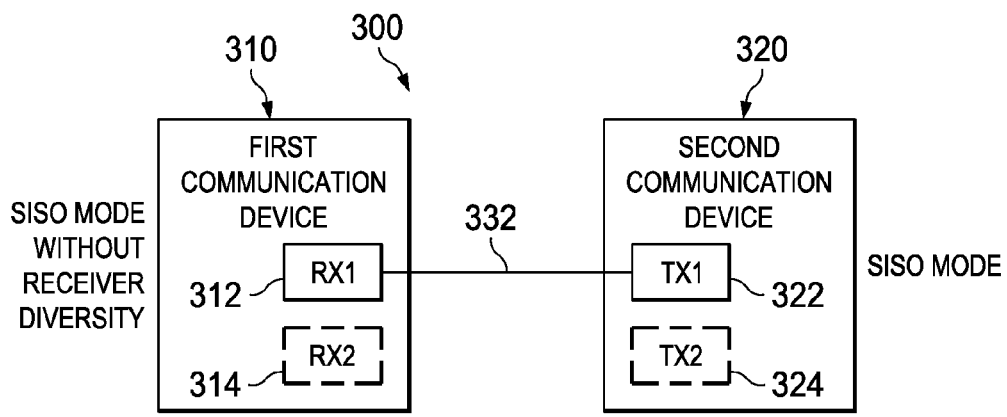
FIGS. 3A, 3B, 3C and 3D depict various communication modes which may be selected in accordance with embodiments of this disclosure.

In FIG. 3A, a first SISO mode 300 (without receiver diversity) is depicted. A first communication device 310 may comprise a first receiver 312 (RX1) and may have a second receiver 314 (RX2). The first receiver 312 receives data via the first channel 332 (e.g., LN-LN) from a first transmitter 322 of a second communication device 320. The second communication device 320 may also have a second transmitter 324, but it may not be used in the SISO mode depicted in FIG. 3A.

Figure 3B:
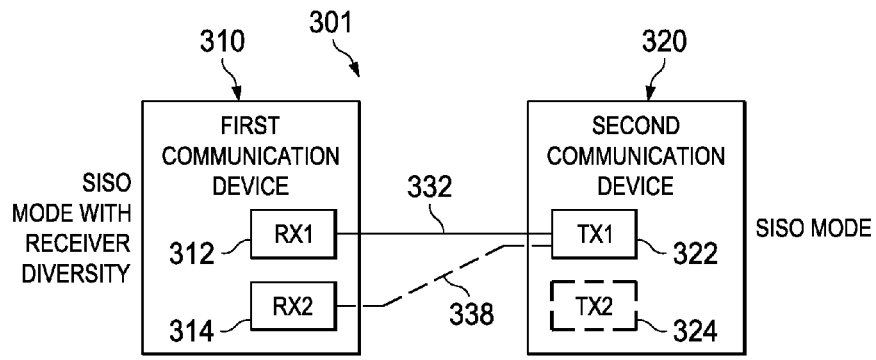

In FIG. 3B, a second SISO mode 301 (with receiver diversity) is depicted. The first communication device 310 may comprise the first receiver 312 (RX1) and the second receiver 314 (RX2). The first receiver 312 may receive a signal via the first channel 332 (e.g., LN-LN) from a first transmitter 322 of a second communication device 320. The second communication device 320 may also have a second transmitter 324, but it may not be used in the SISO mode depicted in FIG. 3A. Different from the first SISO mode 300, the second SISO mode 301 may use receiver diversity. The second receiver 314 may also receive the signal from the first transmitter 322, even though the second receiver 314 may be communicatively coupled to the second channel (not shown). The second receiver 314 may receive the signal due to crosstalk or energy leakage between the pairs of wires in the powerline medium. The crosstalk is illustrated in FIG. 3B as a third channel 338 (e.g., LN-LG). In a MIMO mode or a SISO mode using receiver diversity, the first communication device 310 may use a diversity combining technique (such as MRC or EGC) to combine the signals that were received by the first receiver 312 and the second receiver 314.

A device capable of operating in MIMO mode may process signals received from a legacy (non-MIMO mode-capable) device using receiver diversity as depicted in FIG. 3B. However, in this disclosure, the first communication device 310 may select the first SISO mode 300 for communication (without receiver diversity) in response to detecting that the second channel is ill-conditioned as described herein. An ill-conditioned channel may cause poor performance in the second SISO mode 301 (with receiver diversity) as compared to the first SISO mode 300 (without receiver diversity).

Figure 3C:
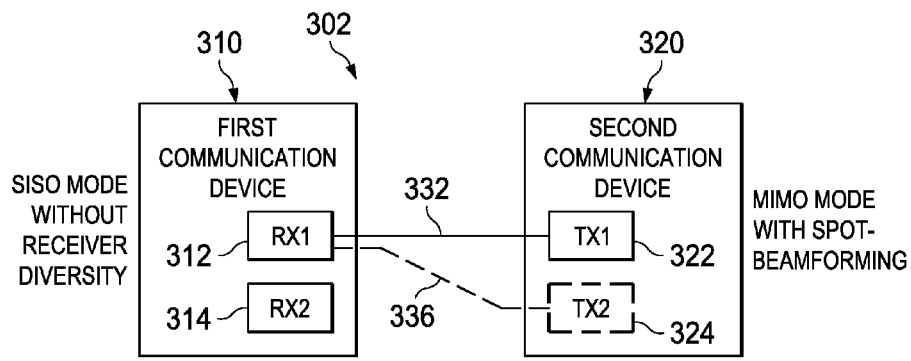

In FIG. 3C, the second communication device 320 may use a MIMO spot beamforming mode 302. In MIMO spot beamforming mode, the second communication device 320 may take advantage of crosstalk from the LG wire pair to add energy to the LN wire pair. The crosstalk is illustrated in FIG. 3C as a fourth channel 336. The second communication device 320 may transmit the same data via the first channel 332 and the fourth channel 336 to improve reception at the first receiver 312 of the first communication device 310. Normally, by sending the same single stream packet using the two transmitters together with beamforming, communication performance (e.g. throughput, reliability, etc.) would be improved. However, if the fourth channel is ill-conditioned, then MIMO spot beamforming mode may not work as effectively. Under such a condition, the first communication device 310 may select a SISO mode without receiver diversity. The first communication device 310 may also inform the second communication device 320 that the first communication device 310 has detected an ill-conditioned channel and may instruct the second communication device 320 to use a SISO mode.

Figure 3D:
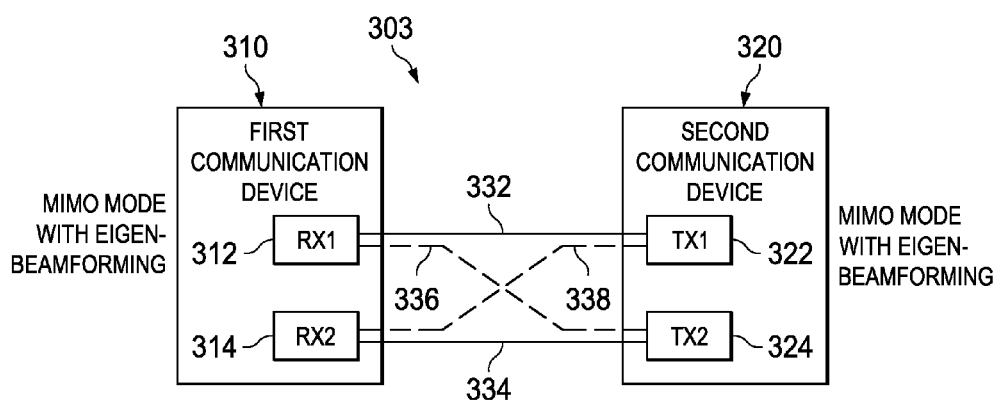

In FIG. 3D, the MIMO Eigen beamforming mode 303 is depicted. The second communication device 320 may transmit two different data streams: one data stream on first channel 332 and one stream on the second channel 334. The second communication device 320 may perform signal processing to utilize the first channel 332 (LN), the second channel 334 (LG), the fourth channel 336 (LN-to-LG crosstalk), and the third channel 338 (LG-to-LN crosstalk) to convey the two data streams. Typically, the beamforming may be performed utilizing a mathematical calculation involving beamforming coefficients at the transmitting device and the receiving device to properly transmit (on the transmit side) different combinations of the two streams of data so that the receiver (on the receiver side) can distinguish the two streams as is further described below. However, if an ill-conditioned channel is present, the beamforming coefficients may be skewed detrimentally. Under such a condition, the first communication device 310 may switch to a SISO mode for reception and may inform the second communication device 320 to switch to either MIMO spot-beamforming mode or a SISO mode for transmission.

Figures 4A, 4B:
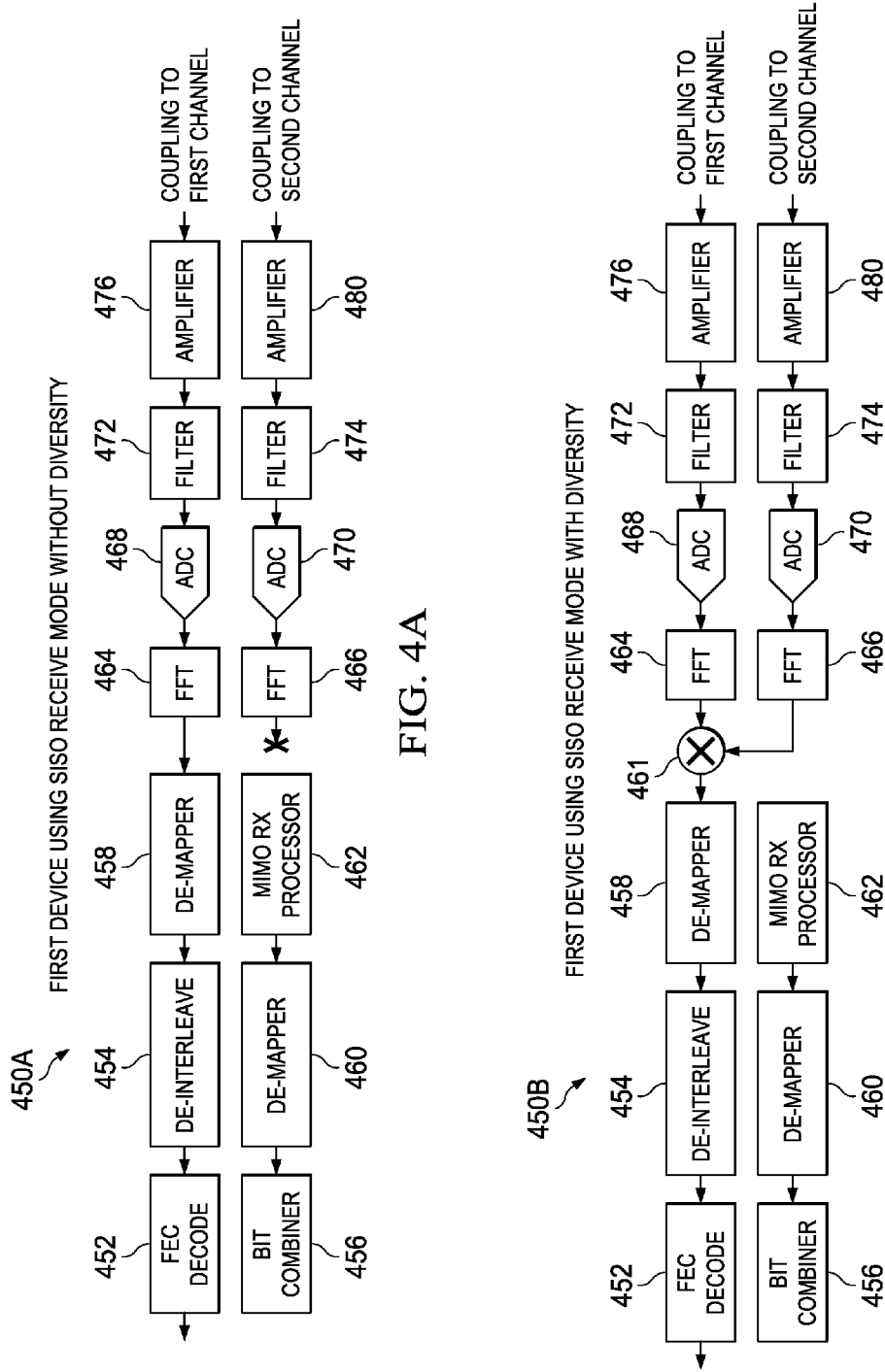
FIGS. 4A, 4B, 4C, and 4D depict hardware configurations for various receive modes which may be selected in accordance with embodiments of this disclosure.

FIGS. 4A, 4B, 4C, and 4D depict hardware configurations for various receive modes which may be selected in accordance with embodiments of this disclosure. FIG. 4A depicts an example block diagram 450A of receive portion of a first communication device operating in a first SISO mode without receiver diversity. The receive portion may include a forward error correction (FEC) decode unit 452, a de-interleave unit 454, a bit combiner 456, a first de-mapper 458, a second de-mapper 460, a MIMO RX processor 462, a first fast Fourier transform (FFT) unit 464, a second FFT unit 466, a first analog-to-digital converter (ADC) 468, a second ADC 470, a first filter 472, a second filter 474, a first amplifier 476 and a second amplifier 480.

In some implementations, the receive portion may include two receive chains to receive transmissions from a source powerline communication device of the network. The first receive chain can include the first amplifier 476, the first filter 472, the first ADC 468, the first FFT unit 464 and the first de-mapper 458. The second receive chain may include the second amplifier 480, the second filter 474, the second ADC 470, the second FFT unit 466 and the second de-mapper 460. The FEC decode unit 452, the de-interleave unit 454, the bit combiner 456 and the MIMO RX processor 462 may be common to both receive chains. However, in the SISO mode depicted in FIG. 4A, the second receive chain, the MIMO RX processor 462, the second de-mapper 460, and the bit combiner 456 may not be used.

The first amplifier 476 can amplify a signal received at a first port (e.g., for the L-N channel) and can send the amplified signal to the first filter 472. The first filter 472 may filter the amplified signal to remove extraneous frequency components (e.g., frequency components outside the powerline communication frequency band). Then, the first filter 472 can send the filtered signal to the first ADC 468. The first ADC 468 can convert analog signals (received from the first filter 472) to a digital signal. The first ADC 468 may send the digital signal to the first FFT unit 464. The first FFT unit 464 may convert time-domain signal (received from the first ADC 468) to frequency-domain signal using a Fast Fourier Transform. The first FFT unit 464 may send the converted signal to the first de-mapper 458. The first de-mapper 458 can decode received symbol streams into a bit stream. The first de-mapper 458 can then send the bit stream to the de-interleave unit 454. The de-interleave unit 454 can rearrange the bit stream received. The de-interleave unit 454 can then send the rearranged bit stream to the FEC decode unit 452. The FEC decode unit 452 may detect one or more errors in the bit stream received from the de-interleave unit 454. In some implementations, the FEC decode unit 452 can also correct one or more errors in a received bit stream.

FIG. 4B depicts an example block diagram 450B of receive portion of a first communication device operating in a second SISO mode using receiver diversity. FIG. 4B includes the same blocks as described in FIG. 4A. However, in FIG. 4B, a second receive chain may be used to improve processing of the SISO data stream. As depicted in FIG. 4B, the second receive chain may comprise the second amplifier 480, the second filter 474, the second ADC 470, and second FFT unit 466.

The second amplifier 480 can amplify a signal received at the second port (e.g., for the L-G channel). The second amplifier 480 can send the amplified signal to the second filter 474. The second filter 474 may filter the amplified signal to and send a filtered signal to the second ADC 470. The second ADC 470 can convert analog signals, which may be received from the second filter 474, to a digital signal. The second ADC 470 may send the digital signal to the second FFT unit 466. The second FFT unit 466 may convert time-domain signal, received from the second ADC 470, to frequency-domain signal using a Fast Fourier Transform.

In FIG. 4B, a first frequency-domain signal from the first receive chain and a second frequency-domain signal from the second receive chain can be combined at a diversity combiner 461. The diversity combiner 461 may use MRC, EGC, or other combination techniques to combine the signals to a single signal that is sent to the first de-mapper 458. The first de-mapper 458 can decode received symbol streams into a bit stream and send the bit stream to the de-interleave unit 454. The de-interleave unit 454 can rearrange the bit stream and send the rearranged bit stream to the FEC decode unit 452 for decoding and error correction.

FIG. 4B depicts diversity combiner 461 as a frequency-domain signal combiner. However, in some embodiments, the diversity combiner 461 may be located before the first FFT unit 464 and may combine time-domain signals. In some embodiments, the MIMO RX processor 462 may be used to perform the features of the diversity combiner 461. For example, the MIMO RX processor 462 may combine the signals using MRC, EGC, or other combination techniques without creating a second bit stream.

Figure 4C:
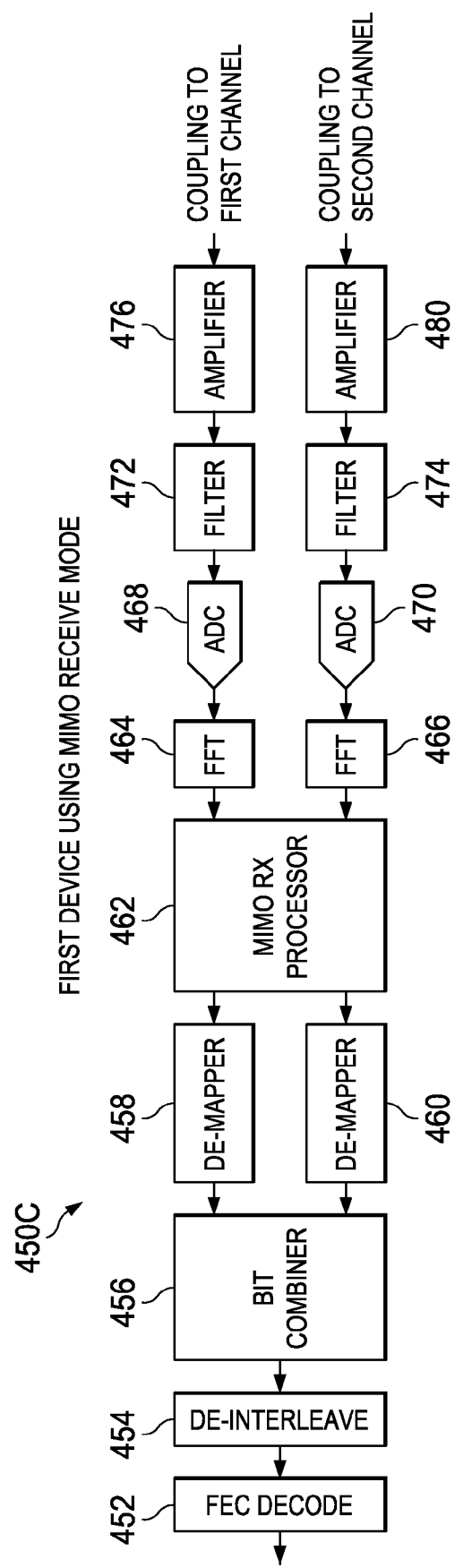

FIG. 4C depicts an example block diagram 450C of a first communication device operating in MIMO mode. The communication device may include an FEC decode unit 452, a de-interleave unit 454, a bit combiner 456, a first de-mapper 458, a second de-mapper 460, a MIMO RX processor 462, a first FFT unit 464, a second FFT unit 466, a first ADC 468, a second ADC 470, a first filter 472, a second filter 474, a first amplifier 476, and a second amplifier 480. Similar to the SISO with receiver diversity mode, both the receive chains may be used to receive signals. In each receive chain, a signal may be received, amplified (by first amplifier 476 and second amplifier 480, respectively), filtered (by first filter 472 and second filter 474, respectively), converted to a time-digital signal (by first ADC 468 and second 470, respectively), and converted to a frequency domain signal (by first FFT unit 464 and second FFT unit 466, respectively). The first FFT unit 464 and the second FFT unit 466 can send the frequency domain signals to the MIMO RX processor 462. The MIMO RX processor 462 may perform one or more operations (e.g., weighted amplification of different signals, etc.) on the signals received from the first FFT unit 464 and the second FFT unit 466. The MIMO RX processor 462 may send the processed signals to the first de-mapper 458 and the second de-mapper 460. The first de-mapper 458 and the second de-mapper 460 may decode received symbol streams into bit streams. The first de-mapper 458 and the second de-mapper 460 can send the bit streams to the bit combiner 456. The bit combiner 456 can combine the two bit streams received from the first de-mapper 458 and the second de-mapper 460 into a single bit stream. The bit combiner 456 sends the single bit stream to the de-interleave unit 454. The de-interleave unit 454 may rearrange the bit stream received from the bit combiner 456. The de-interleave unit 454 may also send the rearranged bit stream to the FEC decode unit 452. The FEC decode unit 452 may detect one or more errors in the bit stream received from the de-interleave unit 454. In some implementations, the FEC decode unit 452 can also correct one or more errors in a received bit stream.

As described above, when a communication device operates in SISO mode, one receive chain may be in operation. For example, the bit combiner 456, the MIMO RX processor 462, and the second receive chain in the receiver 450 may be bypassed. On the other hand, when a communication device operates in MIMO mode, both receive chains that may be in operation. In accordance with the present disclosure, a communication device can operate in a SISO mode or a MIMO mode. The communication device, when configured in MIMO mode can communicate with other devices in MIMO mode at full-rate, but may suffer performance degradation when communicating with other higher-bandwidth devices in SISO mode. Similarly, the communication device, when configured as a higher-bandwidth device in SISO mode, can communicate with other high-bandwidth devices in SISO mode at full-rate, but may suffer a performance loss when communicating with other lower-bandwidth devices in MIMO mode. However, using a dynamic mode selector (not shown), the communication device can allow operation in mixed powerline communication networks (i.e. networks that include higher-bandwidth devices operating in SISO modes and lower-bandwidth devices operating MIMO modes). For example, the two transmit/receive chains in the communication device may be always on, and based on the data input of the second transmit/receive chain, the mode selector may instruct the MIMO RX processor 462 to either utilize or bypass the second transmit/receive chain for operating in either of the MIMO or SISO modes, respectively.

In a mixed powerline communication network, the first communication device can receive transmissions either from a lower-bandwidth device operating in MIMO mode or from a higher-bandwidth device operating in SISO mode. The transmissions in both SISO and MIMO modes on a powerline communication network may have similar packet structures. Typically a packet includes three different portions: Preamble for packet detection and synchronization; Frame-Control, which may include carrier information about the payload that follows in the packet (e.g., source-id, length, MIMO or SISO mode payload); and Payload, which may include data sent from a transmitter to a receiver. A powerline medium may be a contention based medium on which communication devices contend for access of the shared medium. During contention, all the communication devices in the network typically may identify frame-control information in transmitted packets. The communication devices may extract the packet length from the frame-control, and set a back-off counter to avoid contending for the shared medium during the corresponding payload duration. For devices in MIMO and SISO modes to co-exist and interoperate, the devices can listen to each other's frame-control information.

In powerline standards (e.g., HomePlug™ AV, Home-Plug™ AV2, etc.), frame-control may be identical for both MIMO and SISO modes. The first communication device may process the frame-control in the same manner for packets transmitted from devices in either MIMO or SISO modes. Hence, the first communication device may detect a packet and decode the frame-control of the packet in a similar manner irrespective of whether the transmission is from a device operating in either MIMO or SISO mode. The mode (MIMO/SISO) of the payload may be conveyed in the frame-control header of the packet. For example, bits that were reserved in frame-control header in the HomePlug™ AV format may be used to convey mode information in the HomePlug™ AV2 format. As another example, a device limited to SISO capability operating under HomePlug™ AV protocol may ignore the frame control bits that are used to convey mode information. In contrast, some modern devices, which implement the HomePlug™ AV2 protocol and can support both SISO and MIMO modes, can extract the additional information from the frame-control.

In one embodiment, a first communication device may monitor transmissions to determine performance metrics for both MIMO and SISO modes of operation. For example, devices capable of operating in MIMO mode may send some transmissions in SISO mode so that devices not capable of operating in MIMO mode in a mixed-mode communication system can use a legacy protocol to interpret the transmissions in SISO mode. For example, broadcast messages, acknowledgements, timing/synchronization, sounding messages, etc., may be sent in SISO mode for transmission. The devices capable of operating in MIMO mode may send some transmissions in SISO mode and may send some other transmissions in MIMO mode. The first communication device may monitor for the SISO transmissions and MIMO transmissions and generate different performance metrics (and channel condition measurements) associated with each of the SISO or MIMO modes, respectively. The performance metrics (or channel condition measurements) may be averaged over a period of time or over a plurality of frequencies. The first communication device may select between the SISO mode and the MIMO mode based at least in part on the performance metrics (or channel condition measurements) to select the mode that provides the better performance. For example, the first communication device may estimate a SISO-mode PHY rate based on broadcast messages sent in SISO mode. The first communication device may estimate a MIMO-mode PHY rate based on other messages sent in MIMO mode for transmission. The first communication device may select the SISO mode of operation if the SISO-mode PHY rate is higher than the MIMO-mode PHY rate, and vice versa. As such, even though the first communication device may be capable of operating in MIMO mode and may be configured by default to use a MIMO mode of communication with another device capable of operating in MIMO mode, if the PHY rate for communication in SISO mode would be higher, the first communication device may select the SISO mode to improve performance.

In some embodiments, the first communication device may not be able to pre-configure itself in either SISO or MIMO mode before receiving a network packet. For example, the receiver may not know which device in the network is sending the network packet, the operational mode and other characteristics associated with the transmitting device, etc. In one implementation, the first communication device uses a signal that it receives on the LN port to decode the frame-control, which can indicate to the first communication device whether the network packet was sent from a device in SISO mode or a device in MIMO mode. For example, a mode selector (not shown) may receive the frame-control information from one or more components of the first receive chain and determine whether the operational mode of the transmitting device is MIMO mode or SISO mode. The mode selector may then instruct the MIMO RX processor 462 to process or not to process any signals received on the second transmit chain. For example, when the mode selector determines that the operational mode of the transmitting device is SISO mode, the mode selector may instruct the MIMO RX processor 462 to ignore any signals received from the second receive chain to switch to SISO mode. In other examples, the mode selector may configure one or more components in the receiver 450 to bypass the second receive chain. The mode selector may send control signals to a switch, a multiplexer, etc. to bypass the bit combiner 456, the MIMO RX processor 462, etc. in the second receive chain. In some implementations, the mode selector may turn-off one or more components (e.g., the second FFT unit 466, the second de-mapper 460, the bit combiner 456, etc.) to switch to SISO mode. Similarly, when the mode selector determines that the operational mode of the transmitting device is MIMO mode, the mode selector may instruct the MIMO RX processor 462 to utilize the signal received on the second receive chain to switch to MIMO mode. In some implementations, the mode selector may improve the performance of the receiver 450 communicating with larger-bandwidth device operating in SISO mode by instructing the MIMO RX processor 462 to utilize diversity techniques (e.g., polarization, spread spectrum, etc.). The mode selector may also instruct the MIMO RX processor 462 to perform MRC (maximal ratio combining) or EGC (equal gain combining) on the inputs from the first FFT unit 464 and the second FFT unit 466. In one implementation, MRC or EGC may not be done for the entire SISO bandwidth but for those carriers that lie in the intersection of the bandwidths for MIMO and SISO modes. When the transmission mode is in MIMO mode, the bit combiner 456 can revert back to MIMO mode of operation. The dynamic implementation of the receiver 450 may allow the first communication device to maintain its performance level when communicating with larger-bandwidth devices in SISO mode or smaller-bandwidth devices in MIMO mode.

Figure 4D:
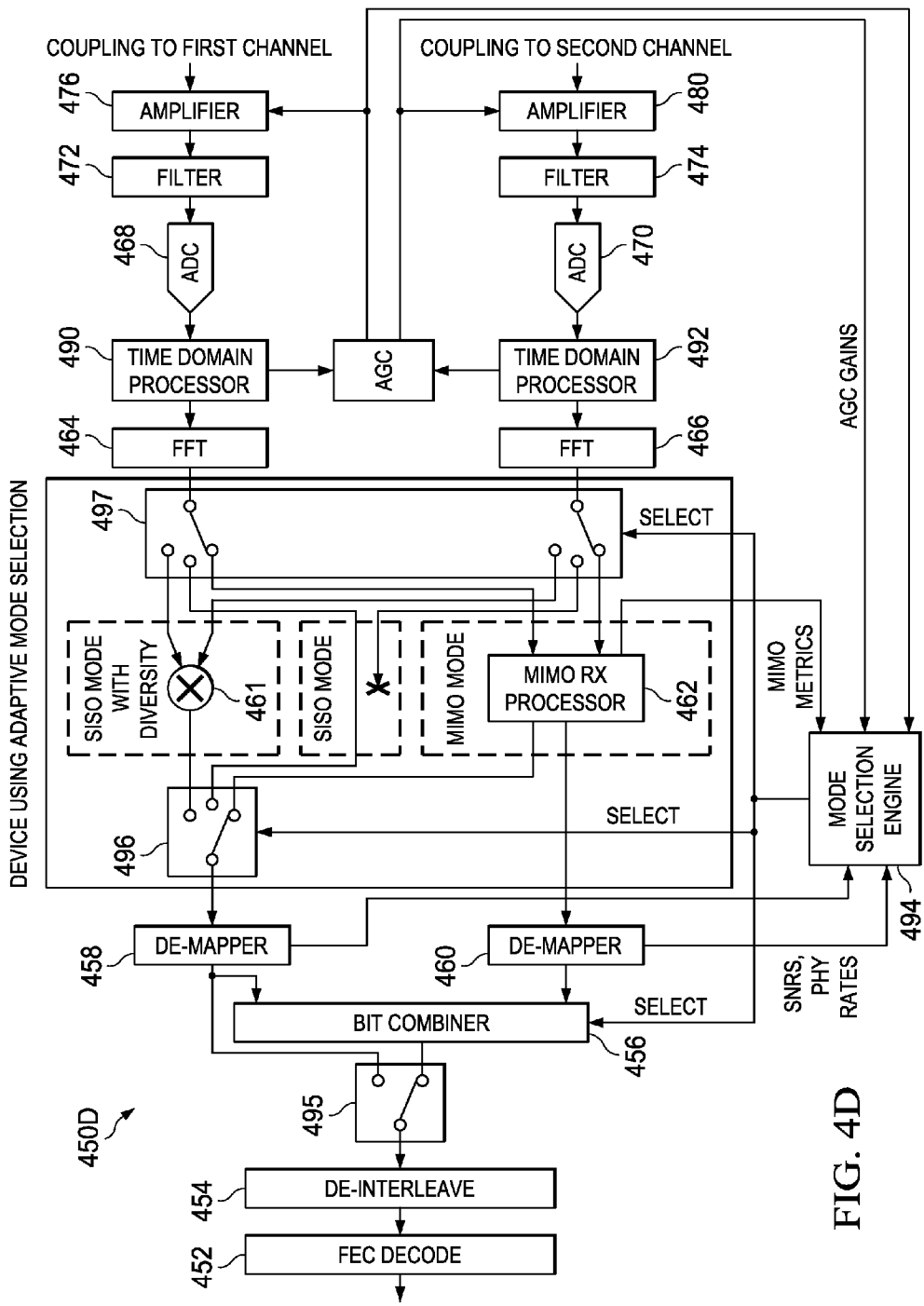

FIG. 4D depicts an example block diagram depicting a system 450D having adaptive mode selection capabilities. System 450D may comprise various system features that advantageously allow for selection between MIMO and SISO modes. For example, system 450D may comprise time domain processors 490, 492. Time domain processors 490, 492 may be operable to perform time domain processing such as filtering, windowing, and other operations on the time domain waveform at the ADC outputs from the first ADC 468 and the second ADC 470, respectively. Time domain processors 490, 492 may allow system 450D to determine AGC values at various points during operation. Thus, time domain processors 490, 492 may help the system 450D determine whether a MIMO or SISO mode may be more efficient.

As another example, system 450D may comprise mode selection engine 494. Mode selection engine 494 may receive various metrics to assess and determine whether a MIMO or SISO mode may be more efficient. Metrics received by mode selection engine 494 may include AGC gains, MIMO metrics, SNR measurement, PHY block (PB) error rate, or an estimated PHY throughput data rate. MIMO metrics may be received from MIMO RX Processor 462 and may include metrics such as ZFE weights, beamforming coefficients, determinant of channel matrix, and others. SNR measurements and PHY block (PB) error rate may be received from the first and second de-mappers 458, 460. Based on the metrics received, mode selection engine 494 may determine an optimal communication mode and output a corresponding signal, such as a SELECT signal.

A SELECT signal output by mode selection engine 494 may be transmitted to or may be received by mode selection switches 495, 496, 497. Based on the SELECT signal received, mode selection switches 495, 496, 497 may switch system 450D to a corresponding communication mode such as SISO mode, SISO with receiver diversity mode, and MIMO mode.

Figure 5:
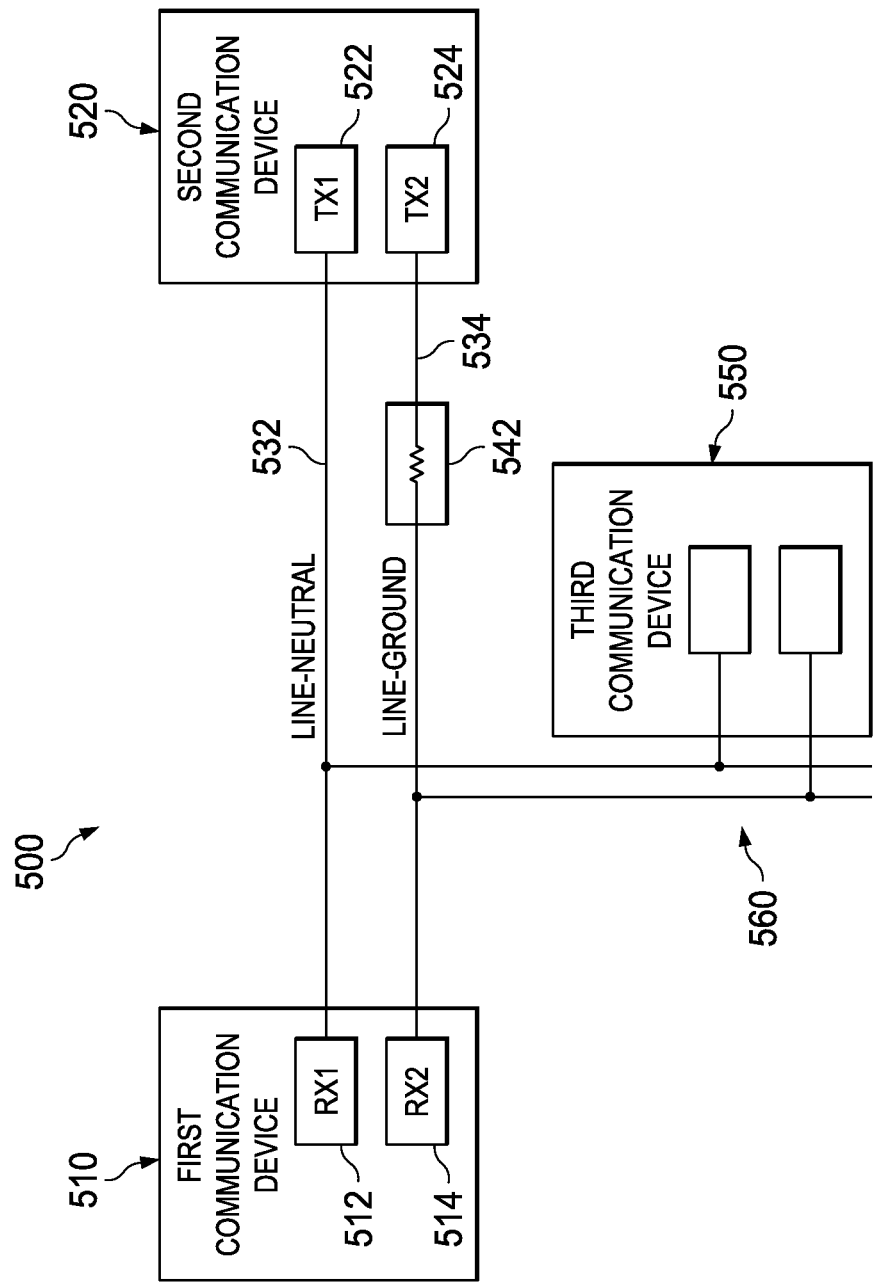
FIG. 5 depicts an example system in which a communication mode is dynamically determined for different transmitting devices in accordance with an embodiment of this disclosure.

FIG. 5 depicts an example system 500 in which a communication mode is dynamically determined for different transmitting devices in accordance with an embodiment of this disclosure. In the example system, a first communication device 510, second communication device 520 and third communication device 550 may all be devices, capable of communications in a MIMO mode, that are communicatively coupled to a powerline medium 560. The first communication device 510 may have a first receiver 512 and a second receiver 514, communicatively coupled to a first channel 532 and a second channel 534 respectively. The second communication device 520 may have a first transmitter 522 and a second transmitter 524 also communicatively coupled to a first channel 532 and a second channel 534 respectively.

In some circumstances, the second channel 534 may have an asymmetric attenuation 542 relative to the first channel 532. In an example scenario, the second communication device 520 may be plugged into an electrical outlet which does not have a ground wire or the ground wire is attenuated due to protective circuitry. The first communication device 510 may select a SISO mode for receiving a signal from the second communication device 520. Typically, a receiving device may measure channel conditions and send the channel conditions or determinations regarding channel configuration to a transmitting device. The transmitting device may use the channel conditions or determinations regarding channel configuration to determine a transmission mode. In the example in FIG. 5, the second communication device 520 may use a SISO mode due to the asymmetric attenuation 542 associated with the second channel 534. The first communication device 510 may use a SISO mode, and may select between using receiver diversity or without receiver diversity based on which setting results in a higher performance.

The cause of the impairment to the second channel for the second communication device 520 may not cause impairment to the second cannel for the third communication device 550. For example, the third communication device 550 may be plugged into an electrical outlet that has the ground wire. Consequently, the second channel between the third communication device 550 and the first communication device 510 may properly support MIMO mode. The first communication device 510 may switch to a MIMO mode for reception and send an indication to the third communication device 550 to use the MIMO mode for transmission.

The first communication device 510 may maintain a listing of which modes are supported between the first communication device 510 and various other communication devices. In this way, the first communication device 510 may select between the SISO and MIMO modes for reception that may be appropriate for each of the second communication device 520 and third communication device 550. The first communication device 510 may communicate an indication to each of the second communication device 520 and third communication device 550 to instruct which reception mode is selected. In one embodiment, the first communication device 510 may select between SISO with receiver diversity and SISO without receiver diversity independently from whether the transmitting device is using a SISO or MIMO spot-beamforming transmission mode.

Figure 6:
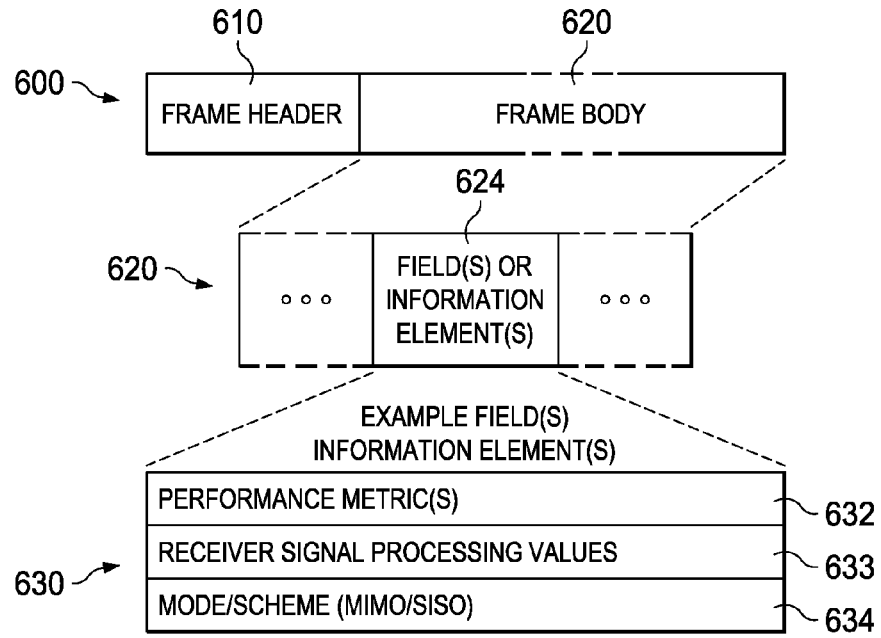
FIG. 6 depicts an example message format that may be used to communicate about mode selection in accordance with an embodiment of this disclosure.

FIG. 6 depicts an example message format 600 that may be used to communicate about mode selection in accordance with an embodiment of this disclosure. The message may be a management message (MME), a channel estimation message, a tone mask message, or any suitable message for exchanging transmission mode information or channel reuse information. The example message format 600 may include a frame header 610 and a frame body 620. The frame body 620 may include one or more fields or information elements 624. Depending on the type of message, the fields or information elements 624 may include different types of mode selection information 630. Example mode selection information 630 may include:

Performance Metric(s) 632: The message may include first performance metrics associated with a first channel, second performance metrics associated with a second channel, and/or a combined performance metric. For example, the performance metrics 632 may be a signal-to-interference-plus-noise-ratio (SINR) estimate for one or more MIMO or SISO modes for communication. This information may be provided to another device, such as a second communication device or a central coordinator.

Receiver signal processing value(s) 633: The message may include signal processing values that describe how the first receiver and second receiver would be configured for the first channel and the second channel, respectively. This information may be provided to the second communication device or the central coordinator to allow the recipient of the receiver signal processing value(s) to select a transmit mode based on the receiver signal processing value(s). In some circumstances, a first communication device and a second communication device may use the same MIMO or SISO modes for communication. For example, in one embodiment, the first communication device and second communication device may independently select different communication modes. A second communication device (transmitting device) may select a SISO mode for transmission, while the first communication device may select a MIMO mode or SISO mode with receiver diversity for receiving transmissions. Alternatively, the first communication device may select a SISO mode (without receiver diversity) regardless of whether the second communication device has selected a transmit diversity mode.

Communication Mode/Scheme 634: The message may indicate a selected communication mode (SISO mode/MIMO mode) as well as a diversity (or not) scheme. The communication mode/scheme 634 may indicate a receive mode selected by the first communication device. The first communication device may also select a transmit mode to be used by the second communication device, and may indicate the selected transmit mode in the communication mode/scheme 634 field. The transmission mode may specify MIMO mode or SISO mode, and may indicate a transmission mode (e.g., MIMO spot beamforming or MIMO Eigen beamforming).

Figure 7:
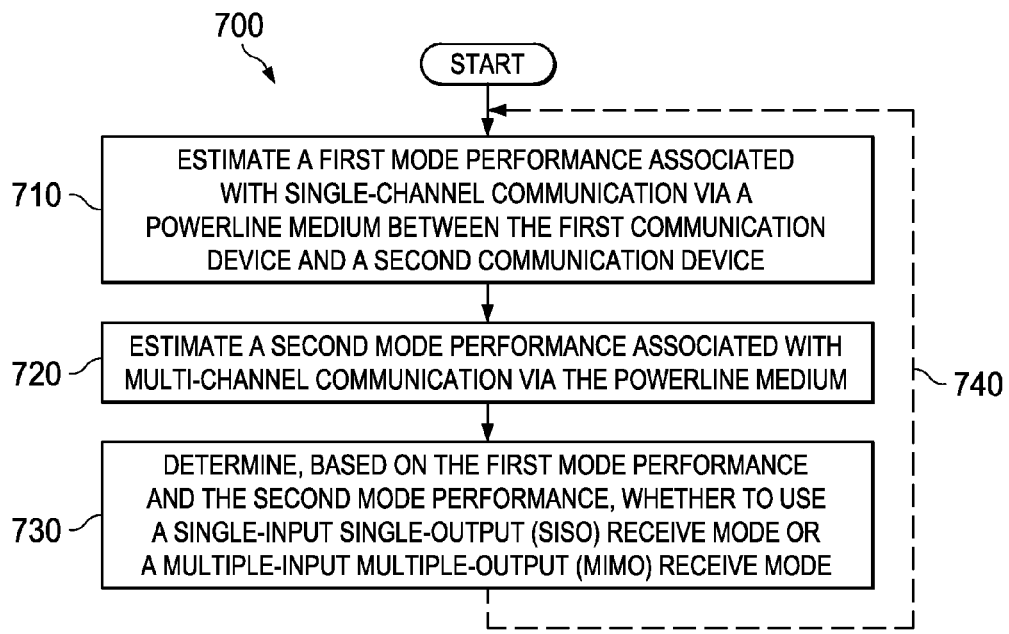
FIG. 7 depicts an example flow diagram in which a receive mode is selected based on channel performance metrics in accordance with an embodiment of this disclosure.

FIG. 7 depicts an example flow diagram 700 for the process by which a receive mode may be selected by a first communication device based on channel performance metrics in accordance with some embodiments of this disclosure.

At block 710, the first communication device may estimate performance of a first mode associated with single-channel communication between the first and second communication devices. Performance of the first mode may be estimated using previous transmissions received during operation of the first communication device in a SISO mode. At block 720, the first communication device may estimate performance of a second mode associated with multi-channel communication. Performance of the second mode performance may be estimated using previous transmissions received during operation of the first communication device in a MIMO mode. At block 730, the first communication device may determine, based on the performance of the first mode and the second mode, whether to use a SISO mode or a MIMO mode to receive transmissions.

Later, the first communication device may return (shown as arrow 740) to block 710 and perform the process again. For example, after a period of time, the first communication device may use the operations depicted in flow diagram 700 to determine whether performance would be improved by switching to a different mode for receiving transmissions.

Figure 8:
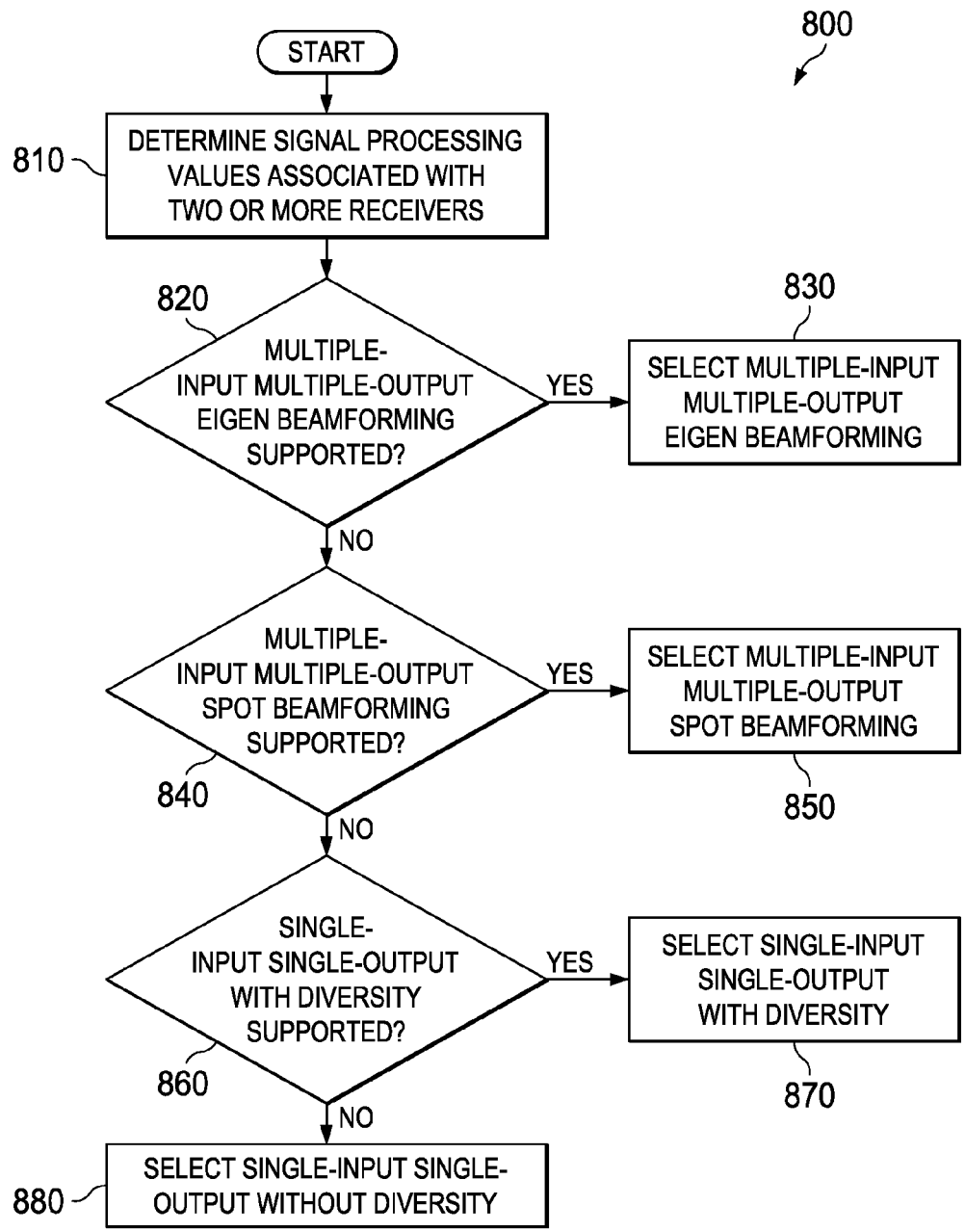
FIG. 8 depicts an example flow diagram in which different MIMO or SISO modes may be selected in accordance with an embodiment of this disclosure.

FIG. 8 depicts an example flow diagram 800 for the process wherein different MIMO or SISO modes may be selected in accordance with an embodiment of this disclosure. In some embodiments, the selection of a reception mode may be based on a prioritization or predefined order, as shown in flow diagram 800. However, any order or prioritization of modes may be defined in alternative embodiments.

At block 810, a first communication device may determine signal processing values associated with two or more receivers. The signal processing values may include AGC gain values for each of the receivers (such as AGC gain values for first amplifier 476 and second amplifier 480 of FIGS. 4A-4C). The signal processing values may also be filter settings, ADC calibration values, channel matrix determinants, beamforming coefficients, or other signal processing values.

At decision 820, the first communication device may determine if MIMO Eigen beamforming mode can be supported. For example, the device may determine whether both of the first channel and second channel are suitable for MIMO modes of communication. If the signal processing values suggest that one of the channels is ill-conditioned or would be detrimental to MIMO Eigen beamforming mode, the flow may proceed to decision 840. Otherwise, the flow may proceed to block 830. At block 830, the first communication device may select the MIMO Eigen beamforming mode as the first option in this example. The first communication device may inform the second communication device to cause the second communication device to use the MIMO Eigen beamforming mode.

At decision 840, the first communication device may determine if MIMO spot beamforming mode can be supported. For example, the first communication device may determine that the second communication device can transmit using MIMO spot beamforming mode to improve reception at a first port of the first communication device. The first communication device may determine to use a SISO mode (with or without receiver diversity) independently from the MIMO spot beamforming mode used by the transmitting device. If MIMO spot beamforming mode cannot be supported, the flow may proceed to decision 860. Otherwise, the flow may proceed to block 850. At block 850, the first communication device may inform the second communication device to use the MIMO spot beamforming mode for transmissions. The first communication device may avoid use of an ill-conditioned channel on the receive side.

At decision 860, the first communication device may determine if a SISO mode with receiver diversity can be supported. If supported, the process may proceed to block 870, where the first communication device informs the transmitting device to use a SISO mode for transmission. The first communication device can then use receiver diversity to improve throughput. However, if an ill-conditioned channel makes the receiver diversity perform poorly, the first communication device may decide that SISO mode with receiver diversity cannot be supported and the process may proceed to block 880.

At block 880, the first communication device may select a SISO mode without receiver diversity. The SISO mode may provide greater throughput if the other modes are negatively affected or impaired by an ill-conditioned channel.

Figure 9:
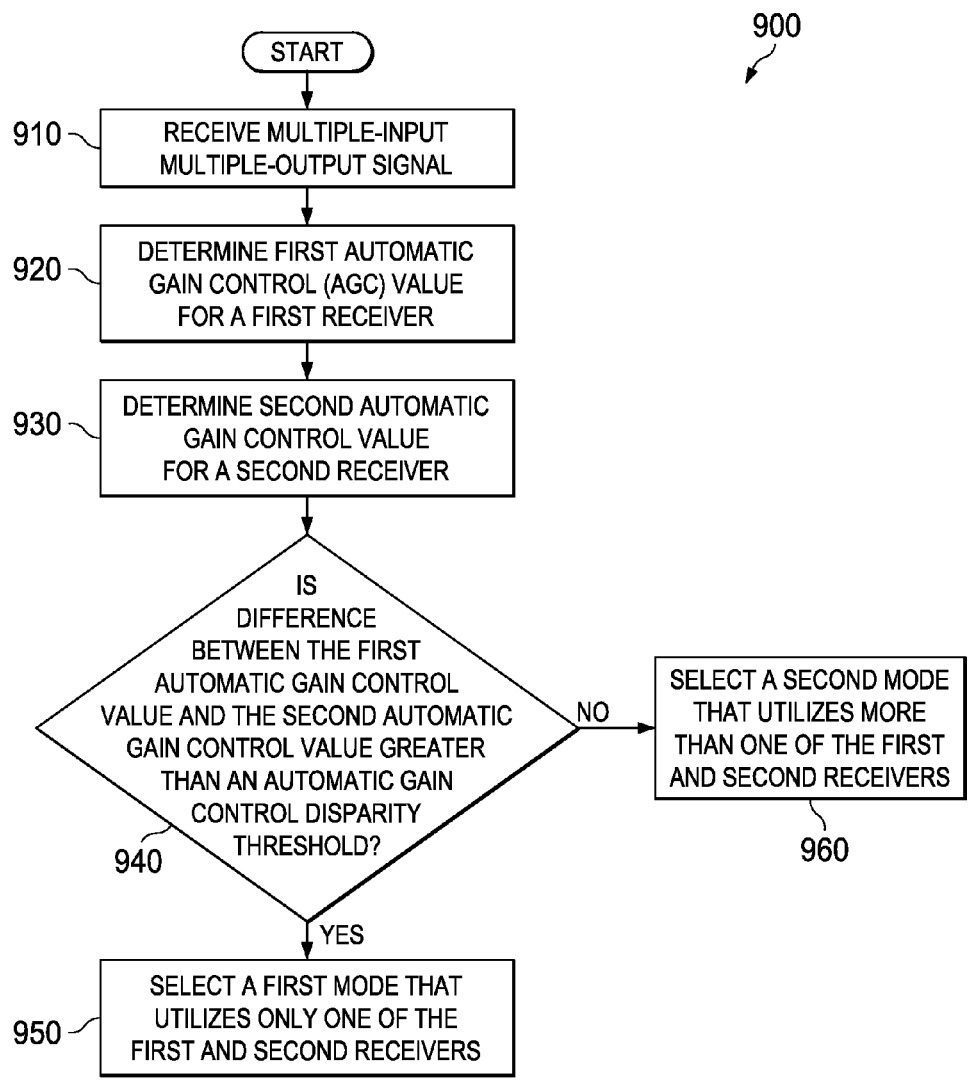
FIG. 9 depicts an example flow diagram in which a receive mode is selected based on AGC values in accordance with an embodiment of this disclosure.

FIG. 9 depicts an example flow diagram 900 for a process wherein a receive mode is selected based on AGC values in accordance with an embodiment of this disclosure. As described previously, a first communication device may include at least a first receiver and a second receiver. At block 910, the first communication device may receive a MIMO signal. For example, the first communication device may receive a MIMO sounding signal, or a MIMO transmission from the second communication device.

At block 920, the first communication device may determine a first AGC value for a first receiver. At block 930, the first communication device may determine second AGC value for a second receiver.

In some circumstances, the difference between the first AGC value for the first receiver and the second AGC value for the second receiver may exceed a particular threshold. This may be indicative of an asymmetric channel. In some embodiments of the present disclosure, the difference between the AGC values can be compared to a programmable threshold to help determine asymmetric channels. At decision 940, the first communication device may determine whether a difference between the first AGC value and the second AGC value is greater than an AGC disparity threshold. If the difference is greater than the AGC disparity threshold, the process continues to block 950. If the difference is not greater than the AGC disparity threshold, the process continues to block 960. The AGC disparity threshold may be a predetermined value or may be a system- or user-configurable parameter.

Figure 10:
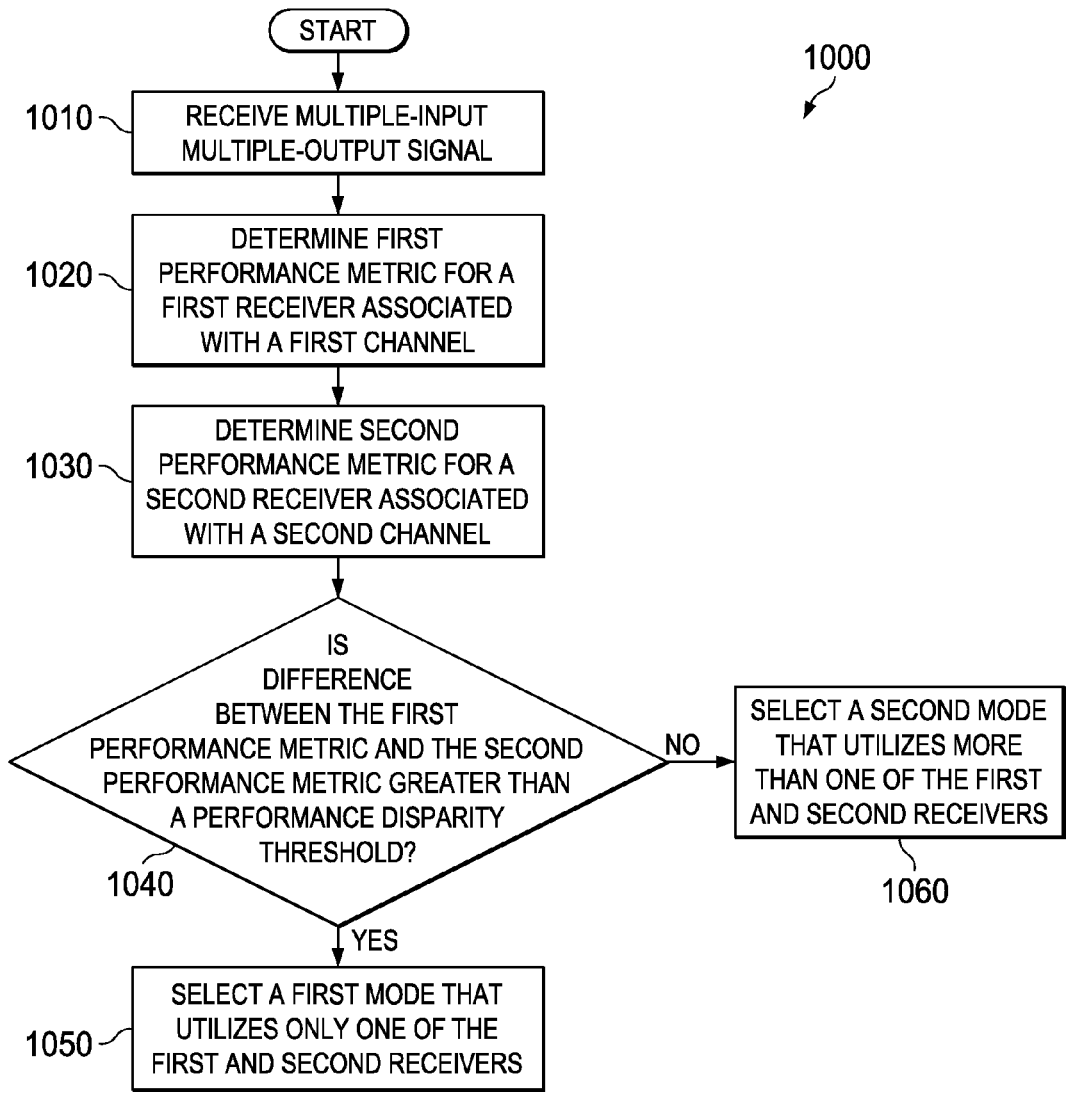
FIG. 10 depicts an example flow diagram in which a receive mode is selected based on performance metrics in accordance with an embodiment of this disclosure.

At block 950, the first communication device may select a first mode that utilizes one of the first and second channels (at one of the receivers). For example, the first mode may be a SISO mode without receiver diversity. The first communication device may determine which channel is ill-conditioned and select the remaining channel for communication in SISO mode. At block 960, if the difference between AGC values is not greater than the AGC disparity threshold, then the first communication device may select a second mode that utilizes more than one of the first and second channels. For example, the second mode may utilize both the first and second channels. The disparity in the AGC values may help the first communication device identify the ill-condition FIG. 10 depicts an example flow diagram 1000 for a process wherein a receive mode may be selected based on performance metrics in accordance with an embodiment of this disclosure.

At block 1010, a first communication device may receive a MIMO signal. At block 1020, the first communication device may determine a first performance metric for a first receiver associated with a first channel. At block 1030, the first communication device may determine a second performance metric for a second receiver associated with a second channel. Examples of the performance metrics may include an SNR measurement, PHY block (PB) error rate, or an estimated PHY throughput data rate.

At decision 1040, the first communication device may determine whether a difference between the first performance metric and the second performance metric is greater than a performance disparity threshold. If the difference is greater than the performance disparity threshold, the process in diagram 1000 continues to block 1050. If the difference is not greater than the performance disparity threshold, the process in diagram 1000 continues to block 1060.

At block 1050, the first communication device may select a first mode that utilizes one of the first and second receivers. At block 1060, the first communication device may select a second mode that utilizes more than one of the first and second receivers. For example, the second mode may utilize both the first and second channels.

Figure 11:
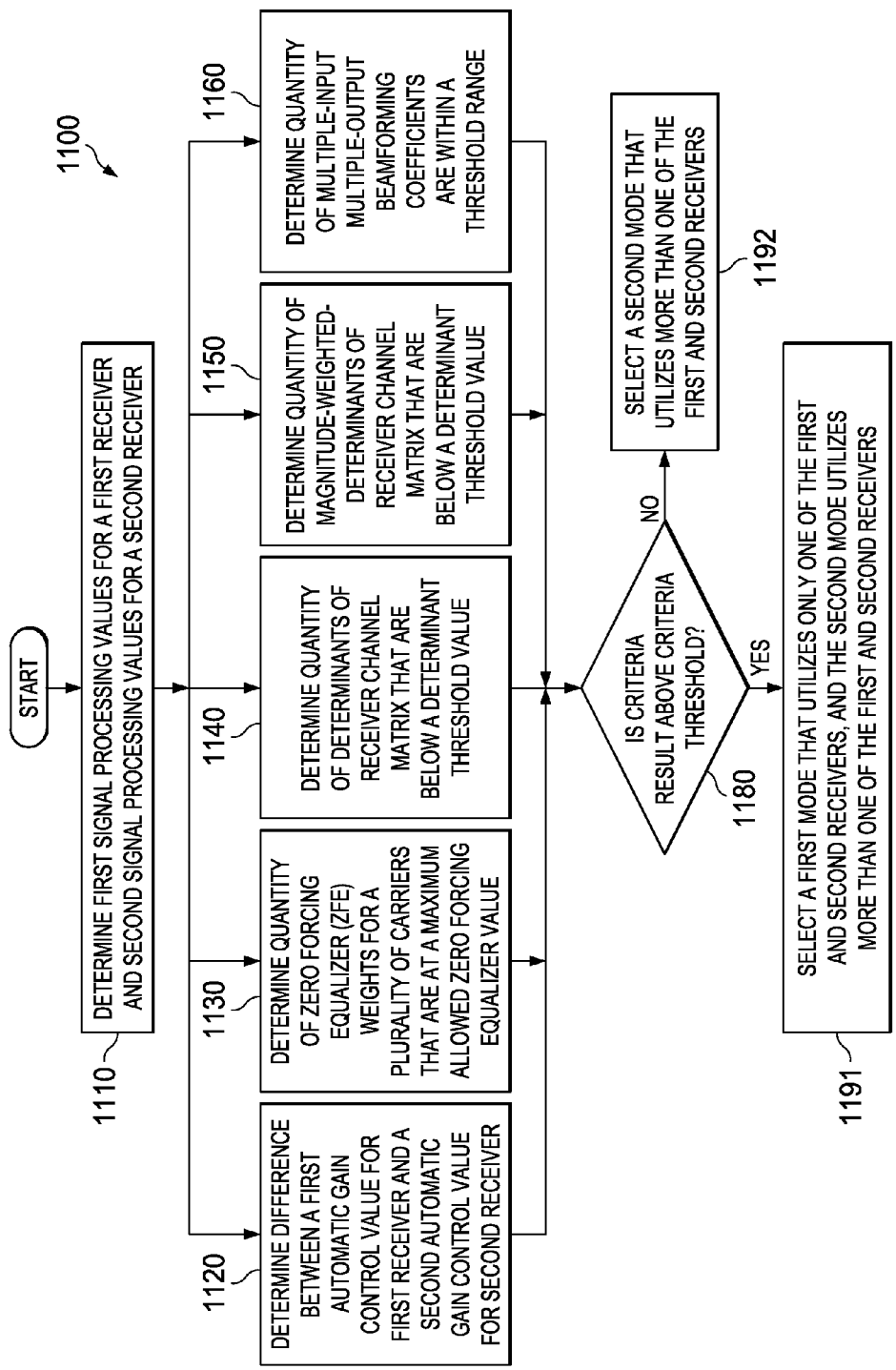
FIG. 11 depicts a flow diagram showing several examples of signal processing values that may be used to select a receive mode in accordance with an embodiment of this disclosure.

FIG. 11 depicts a flow diagram 1100 of a process that may use several signal processing values to select a receive mode in accordance with an embodiment of this disclosure.

At block 1110, a first communication device may determine first signal processing values for a first receiver and second signal processing values for a second receiver. The first signal processing values and the second signal processing values may comprise a variety of settings, including AGC values, ZFE weights, channel matrix determinants, MIMO beamforming coefficients, etc. Depending on the first and second signal processing values, the process in flow diagram 1100 may continue to blocks 1120, 1130, 1140, 1150, and/or 1160.

At block 1120, the first communication device may determine a difference between a first AGC value for first receiver and a second AGC value for second receiver.

At block 1130, the first communication device may determine a quantity of ZFE weights for a plurality of carriers that are at a maximum allowed ZFE value. A zero forcing equalizer is a simple form of a MIMO equalizer. When an ill-conditioned channel is encountered, the ZFE weights typically become very large. In a finite precision implementation in an integrated circuit, the ZFE weights may become saturated (i.e., are clipped at the maximum allowed value for the ZFE output). A powerline communication system may use orthogonal frequency division multiplexing (OFDM) in which a plurality of carriers is used. The ZFE weights need to be calculated for the plurality of carriers. If a majority of the carriers have ZFE weights that are clipping, the first communication device can determine that an ill-conditioned channel is present. At block 1130, the first communication device may determine the percentage of the carriers that have clipped ZFE weights. The result will be compared to a programmable threshold at decision 1180.

At block 1140, the first communication device may determine a quantity of determinants of a receiver channel matrix that are below a determinant threshold value. During equalizer weight calculations, the first communication device may also calculate the determinant of MIMO channel matrix for each carrier. Ill-conditioned channels may have multiple carriers that may have very small determinant values. The quantity of determinants of the receiver channel matrix may be compared with a threshold at decision 1180.

In one implementation, the determinant values can be weighted based on channel magnitude and/or attenuation. At block 1150, the first communication device may determine a quantity of magnitude-weighted-determinants of receiver channel matrix that are below a determinant threshold value.

At block 1160, the first communication device may determine that a quantity of MIMO beamforming coefficients are within a threshold range. To determine the signal processing values, sounding packets may be exchanged between the first communication device and the second communication device to facilitate beamforming calculations. The first communication device calculates beamforming (BF) coefficients (usually in terms of BF angles) and feeds back the calculated BF angles to the second communication device. In one embodiment of this disclosure, the first communication device may analyze the BF angles to identify an ill-conditioned channel. Typical MIMO channels produce random-looking BF angles. In contrast, ill-conditioned channels produce certain BF angles that show certain patterns. The first communication device may determine whether a BF coefficients (or angles) for a majority of carriers are equal to (or very near) to pre-determined BF coefficients (or angles) that correspond to an ill-conditioned channel. In addition to initial BF calculation during initial sounding, BF coefficients can be done periodically from regular (non-sound) MIMO packets. BF coefficients (or angles) that are calculated this way can also be used to determine ill-conditioned channels and switch the communication mode.

At decision 1180, the first communication device may determine whether the criteria result (from block 1120, 1130, 1140, 1150, or 1160) is above a criteria threshold. If the criteria result is above the criteria threshold, the flow 1100 continues to block 1191. If the criteria result is below the criteria threshold, the flow 1100 continues to block 1192.

At block 1191, the first communication device may select a first mode that utilizes one of the first and second receivers. At block 1192, the first communication device may select a second mode that utilizes more than one of the first and second receivers. For example, the second mode may utilize both the first and second channels.

Figure 12:
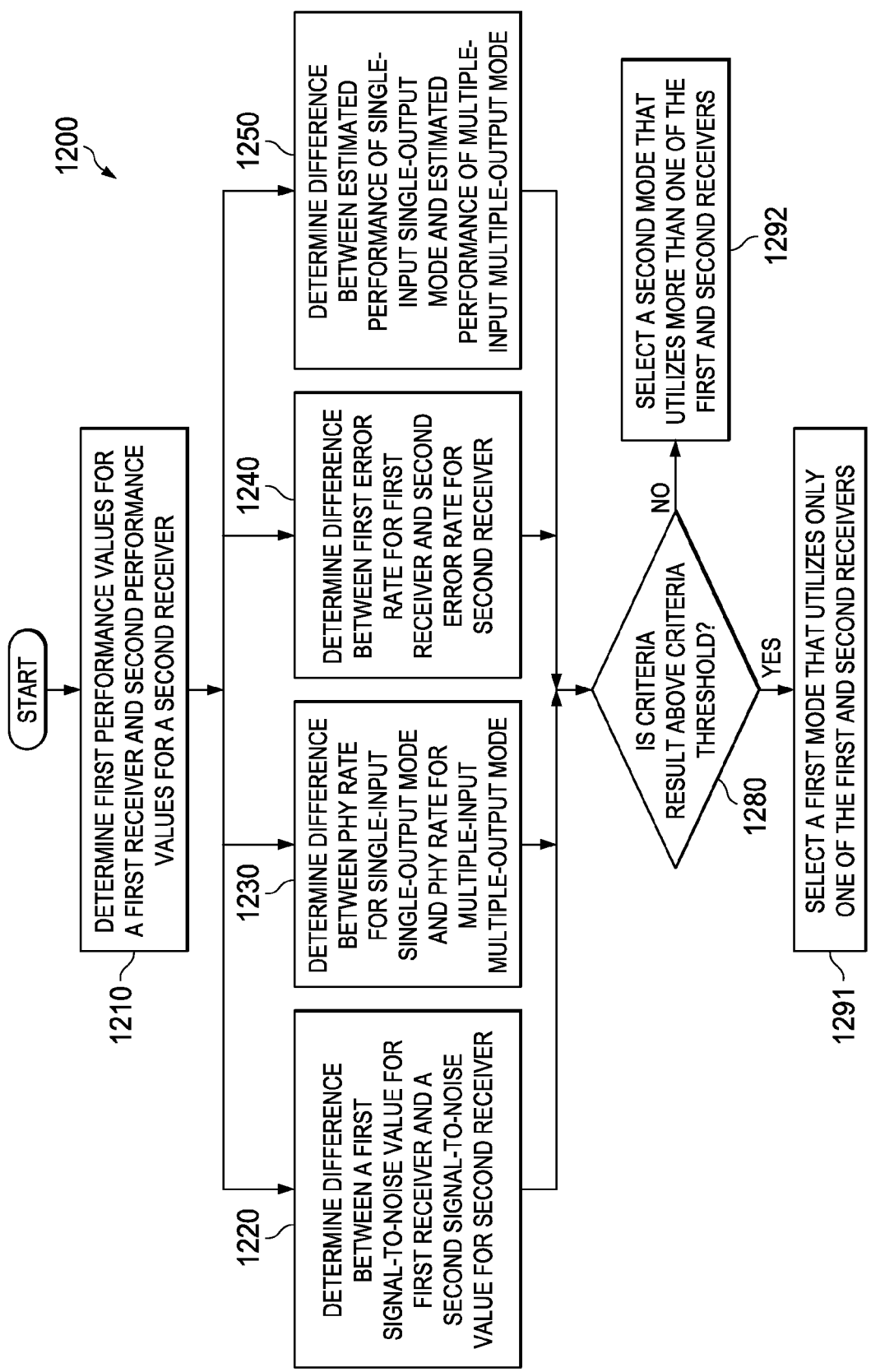
FIG. 12 depicts a flow diagram showing several examples of performance metrics that may be used to select a receive mode in accordance with an embodiment of this disclosure.

FIG. 12 depicts a flow diagram showing several examples of performance metrics that may be used to select a receive mode in accordance with an embodiment of this disclosure.

At block 1210, a first communication device may determine first performance values for a first receiver and second performance values for a second receiver. The first performance values and the second performance values may comprise a variety of metrics, including SNR measurements, PHY rates, error rates, estimated throughput, and the like. Depending on the first and second signal performance values, the flow 1200 may continue to blocks 1220, 1230, 1240, and/or 1250.

At block 1220, the first communication device may determine a difference between a first SNR value for the first receiver and a second SNR value for the second receiver. At block 1230, the first communication device may determine a difference between a first PHY Rate for a SISO mode and second PHY Rate for a MIMO mode. At block 1240, the first communication device may determine a difference between a first error rate for the first receiver and second error rate for the second receiver. At block 1250, the first communication device may determine a difference between a first estimated performance of a SISO mode and second estimated performance of a MIMO mode.

At decision 1280, the first communication device may determine whether the criteria result (from block 1220, 1230, 1240, or 1250) is above a criteria threshold. If the criteria result is above the criteria threshold, the process may continue to block 1291. If the criteria result is below the criteria threshold, the process may continue to block 1292.

At block 1291, the first communication device may select a first mode that utilizes one of the first and second receivers. At block 1292, the first communication device may select a second mode that utilizes more than one of the first and second receivers. For example, the second mode may utilize both the first and second channels.

FIGS. 1-12 and the embodiments described herein are examples meant to aid in understanding various embodiments and should not limit the scope of the claims. Embodiments may perform additional operations, fewer operations, operations in parallel or in a different order, and some operations differently.

In addition to the embodiments described above, other embodiments may be readily conceived. For example, channel performance could affect mode selection. The first communication device may determine a first channel performance associated with a first channel of a powerline medium between the first communication device and a second communication device. The first communication device may determine second channel performance associated with a second channel of the powerline medium between the first communication device and the second communication device. The first communication device may determine whether to use a SISO mode or a MIMO mode for receiving transmissions based on the first channel performance and the second channel performance. Additionally, in some embodiments various combinations of channel performance, mode performance, and/or signal processing values could be used as a criteria for the mode selection.

As will be appreciated by one of ordinary skill in the art, aspects of the present disclosure may be embodied as a system, method, or computer program product. Accordingly, aspects of the present disclosure may take the form of entirely hardware embodiments, software embodiments (including firmware, resident software, micro-code, etc.) or embodiments combining software and hardware aspects that may all generally be referred to herein as a "circuit," "unit" or "system." Furthermore, aspects of the present disclosure may take the form of a computer program product embodied in one or more computer readable medium(s) having computer readable program code embodied thereon.

Any combination of one or more computer readable medium(s) may be utilized, with the sole exception being a transitory, propagating signal. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, and/or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational processes to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
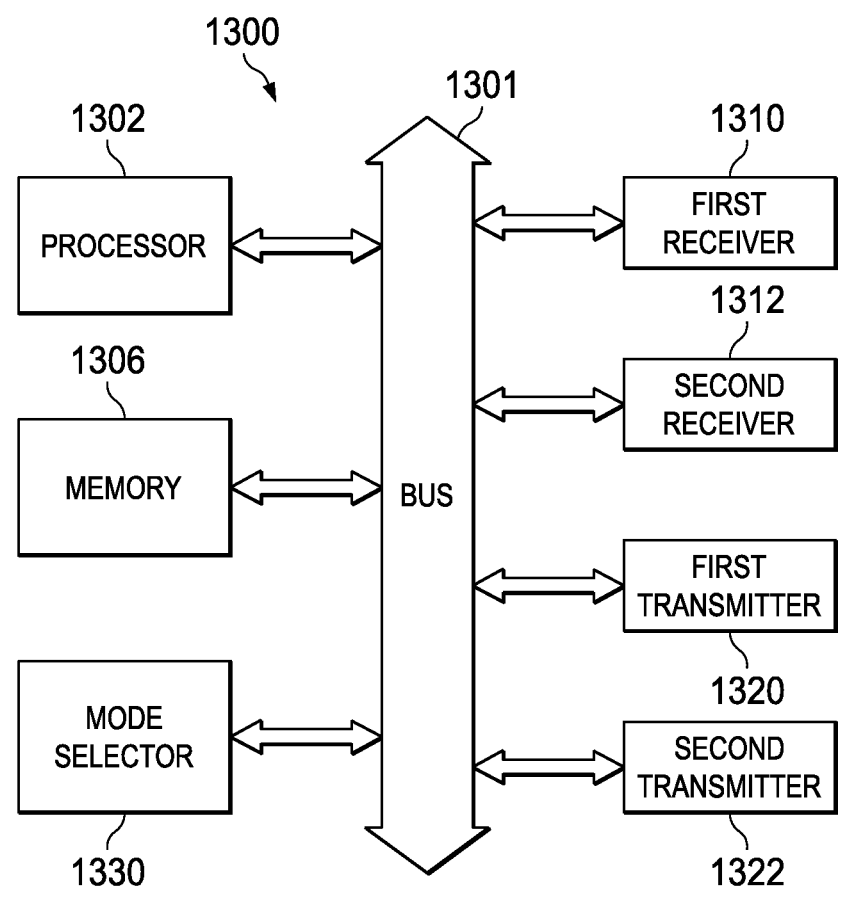
FIG. 13 depicts an example communication device in accordance with an embodiment of this disclosure.

FIG. 13 is an example block diagram of one embodiment of a communication device 1300 capable of implementing various embodiments of this disclosure. In some implementations, the communication device 1300 may be a communication device such as a laptop computer, a tablet computer, a mobile phone, a powerline communication device, a gaming console, or other electronic systems. In some implementations, the communication device may comprise functionality to communicate across multiple communication networks (which form a hybrid communication network). The communication device 1300 includes a processor 1302 (possibly including multiple processors, multiple cores, multiple nodes, and/or implementing multi-threading, etc.). The communication device 1300 includes a memory 1306. The memory 1306 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The communication device 1300 also includes a bus 1301 (e.g., PCI, ISA, PCI-Express, HyperTransport®, InfiniBand®, NuBus, AHB, AXI, etc.). The communication device may include one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.). In FIG. 13, the communication device 1300 may include a first transmitter 1320 and a second transmitter 1322. The communication device may include a first receiver 1310 and a second receiver 1312. Together the transmitters 1320, 1322 and receivers 1310, 1312 may comprise a network interface. The communication device 1300 may include a mode selector 1330 that implements various embodiments described in the forgoing figures. In one embodiment, the memory 1306 stores instructions, which when executed by the processor 1302, may cause the communication device 1300 to perform operations described above.

Any one of these functionalities may be partially (or entirely) implemented in hardware and/or on the processor 1302. For example, the functionality may be implemented with an application specific integrated circuit, in logic implemented in the processor 1302, in a co-processor on a peripheral device or card, etc. Further, realizations may include fewer or additional components not illustrated in FIG. 11 (e.g., video cards, audio cards, additional network interfaces, peripheral devices, etc.). The processor 1302, the memory 1306, transmitters 1320, 1322, and receivers 1310, 1312 may be coupled to the bus 1301. Although illustrated as being coupled to the bus 1301, the memory 1306 may be directly coupled to the processor 1302.

While the embodiments are described with reference to various implementations and exploitations, these embodiments are illustrative and that the scope of the present disclosure is not limited to them. In general, techniques for selecting a receive mode as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method of communication between a first communication device and a second communication device via a plurality of channels of a powerline medium, the method comprising:
determining, by a mode selection engine of the first communication device, first signal processing values, wherein the first signal processing values are associated with receiving at least a first signal associated with a first subset of the plurality of channels of the powerline medium, and wherein the first subset of the plurality of channels includes a first channel;
determining, by the mode selection engine of the first communication device, second signal processing values, wherein the second signal processing values are associated with receiving at least a second signal associated with a second subset of the plurality of channels of the powerline medium, and wherein the second subset of the plurality of channels includes a second channel;

determining whether the powerline medium supports multi-channel communication between the first communication device and the second communication device based at least in part on the first signal processing values and the second signal processing values, wherein determining whether the powerline medium supports the multi-channel communication comprises computing a value based on the first signal processing values and the second signal processing values; and in response to determining the powerline medium supports the multi-channel communication, selecting, by the mode selection engine of the first communication device, a receive mode for the first communication device based at least in part on the computed value being compared to a threshold value; wherein the receive mode is selected from a group consisting of a first mode and a second mode, wherein the first mode utilizes only one of the first and second channels, and the second mode utilizes both the first and second channels.

2. The method of claim 1, wherein in response to the receive mode being the first mode, the receive mode is a first single-input single-output (SISO) mode using only one of the first and second channels without receiver diversity, or wherein in response to the receive mode being the second mode, the receive mode is selected from a group consisting of:
  a second SISO mode using both of the first and second channels for receiver diversity,
  a multiple-input multiple-output (MIMO) eigen-beamforming mode using both of the first and second channels, and
  a MIMO spot-beamforming mode using both of the first and second channels.

3. The method of claim 1, wherein the multi-channel communication comprises the second mode.

4. The method of claim 1, further comprising:
  selecting the second mode in response to determining that the powerline medium supports the multi-channel communication between the first communication device and the second communication device; and
  selecting the first mode in response to determining that the powerline medium does not support the multi-channel communication between the first communication device and the second communication device.

5. The method of claim 1, wherein determining whether the powerline medium supports the multi-channel communication comprises:
  determining a first attenuation associated with the first channel and a second attenuation associated with the second channel based at least in part on the first and second signal processing values; and
  determining whether a difference between the first attenuation and the second attenuation is within a threshold range, wherein the difference comprises the computed value and wherein the threshold range comprises the threshold value.

6. The method of claim 1, wherein the first channel is associated with a first signal propagation path of the powerline medium and the second channel is associated with a second signal propagation path of the powerline medium different from the first signal propagation path.

7. The method of claim 6, wherein selecting the receive mode comprises:

determining whether the powerline medium is missing a conductor associated with either the first signal propagation path or the second signal propagation path based on a difference between the first signal processing values and the second signal processing values, wherein the difference comprises the computed value; and selecting the first mode when the powerline medium is missing the conductor.

8. The method of claim 6, wherein selecting the receive mode comprises:
  determining whether the powerline medium has circuitry that impairs communication capability of a conductor associated with either the first signal propagation path or the second signal propagation path based on a difference between the first signal processing values and the second signal processing values, wherein the difference comprises the computed value; and
  selecting the first mode when the powerline medium has circuitry that impairs communication capability of the conductor.

9. The method of claim 1, further comprising:
  determining the first signal processing values and the second signal processing values based at least in part on previous signals received from the second communication device via the powerline medium.

10. The method of claim 1, wherein the first communication device has at least a first receiver and a second receiver, the method further comprising:
  enabling the first receiver and disabling the second receiver in response to selecting the first mode as the receive mode; and
  enabling the first receiver and the second receiver in response to selecting the second mode as the receive mode.

11. The method of claim 1, further comprising:
  selecting a transmit mode for the second communication device; and
  sending an indication of the transmit mode to the second communication device.

12. The method of claim 11, wherein the transmit mode and the receive mode do not match.

13. The method of claim 12, wherein the transmit mode utilizes only a single transmitter of the second communication device, and wherein the receive mode utilizes more than one receiver of the first communication device.

14. The method of claim 1,
  wherein the first communication device includes at least a first receiver and a second receiver,
  wherein the first signal processing values include a first automatic gain control (AGC) value for the first receiver and the second signal processing values include a second AGC value for the second receiver, and
  wherein selecting the receive mode comprises selecting the first mode when a difference between the first AGC value and the second AGC value is greater than an AGC disparity threshold, wherein the difference comprises the computed value.

15. The method of claim 1,
  wherein the first signal processing values and the second signal processing values include zero forcing equalizer (ZFE) weights for a plurality of carriers, and
  wherein selecting the receive mode comprises selecting the first mode when ZFE weights for a threshold quantity of carriers are at a maximum allowed ZFE value.

16. The method of claim 15, wherein the threshold quantity is represented as a percentage in relation to a total number of carriers in the plurality of carriers.

17. The method of claim 1, wherein selecting the receive mode comprises:
   determining a determinant of a channel matrix for each of a plurality of carriers based at least in part on the first signal processing values and the second signal processing values; and
   selecting the receive mode based at least in part on determinants for the plurality of carriers.

18. The method of claim 17, further comprising:
   selecting the first mode when the determinants for a threshold quantity of the plurality of carriers are below a determinant threshold.

19. The method of claim 17, further comprising:
   determining weighted determinant values based on the determinants for the plurality of carriers in relation to corresponding magnitudes or attenuation associated with the plurality of carriers; and
   selecting the first mode when the weighted determinant values for a threshold quantity of the plurality of carriers are below a weighted determinant threshold.

20. The method of claim 1, wherein selecting the receive mode comprises:
   determining multiple-input multiple-output (MIMO) beamforming coefficients for a plurality of carriers based on the first signal processing values and second signal processing values; and
   selecting the first mode when the MIMO beamforming coefficients for a threshold quantity of carriers are within a threshold range.

21. The method of claim 20, wherein the threshold range is a predetermined range associated with an impaired or defective channel.

22. A first communication device, comprising:
   a network interface configured to receive signals via a plurality of channels of a powerline medium between the first communication device and a second communication device;
   a processor comprising a mode selection engine; and
   a memory storing instructions, which when executed by the mode selection engine, cause the first communication device to:
      determine first signal processing values, wherein the first signal processing values are associated with receiving at least a first signal associated with a first subset of the plurality of channels of the powerline medium, and wherein the first subset of the plurality of channels includes a first channel;
      determine second signal processing values, wherein the second signal processing values are associated with receiving at least a second signal associated with a second subset of the plurality of channels of the powerline medium, and wherein the second subset of the plurality of channels includes a second channel;
      determine whether the powerline medium supports multi-channel communication between the first communication device and the second communication device based at least in part on the first signal processing values and the second signal processing values, wherein determining whether the powerline medium supports the multi-channel communication comprises computing a value based on the first signal processing values and the second signal processing values; and
      in response to determining the powerline medium supports the multi-channel communication, select a receive mode for the first communication device based at least in part on the computed value being compared to a threshold value, the receive mode selected from a group consisting of a first mode and a second mode, wherein the first mode utilizes only one of the first and second channels, and the second mode utilizes both the first and second channels.

23. The first communication device of claim 22, wherein in response to the receive mode being the first mode, the receive mode is a first single-input single-output (SISO) mode using only one of the first and second channels without receiver diversity, or wherein in response to the receive mode being the second mode, the receive mode is selected from a group consisting of:
   a second SISO mode using both of the first and second channels for receiver diversity,
   a multiple-input multiple-output (MIMO) eigen-beamforming mode using both of the first and second channels, and
   a MIMO spot-beamforming mode using both of the first and second channels.

24. The first communication device of claim 22, wherein the instructions, when executed by the mode selection engine, cause the first communication device to:
   select the second mode in response to determining that the powerline medium supports the multi-channel communication between the first communication device and the second communication device; and
   select the first mode in response to determining that the powerline medium does not support the multi-channel communication between the first communication device and the second communication device.

25. The first communication device of claim 22, wherein the network interface includes at least a first receiver and a second receiver, and wherein the instructions, when executed by the mode selection engine, cause the first communication device to:
   enable the first receiver and disable the second receiver in response to selecting the first mode as the receive mode; and
   enable both the first receiver and the second receiver in response to selecting the second mode as the receive mode.

26. The first communication device of claim 22,
   wherein the network interface includes at least a first receiver and a second receiver,
   wherein the first signal processing values include a first automatic gain control (AGC) value for the first receiver and the second signal processing values include a second AGC value for the second receiver, and
   wherein the instructions, when executed by the mode selection engine, cause the first communication device to select the first mode when a difference between the first AGC value and the second AGC value is greater than an AGC disparity threshold, wherein the difference comprises the computed value.

27. The first communication device of claim 22,
   wherein the first signal processing values and the second signal processing values include zero forcing equalizer (ZFE) weights for a plurality of carriers, and
   wherein the instructions, when executed by the mode selection engine, cause the first communication device to select the first mode when ZFE weights for a threshold number of carriers are at a maximum allowed ZFE value.

28. The first communication device of claim 22, wherein the instructions, when executed by the mode selection engine, cause the first communication device to:
determine a determinant of a channel matrix for each of a plurality of carriers based at least in part on the first signal processing values and the second signal processing values; and
select the receive mode based at least in part on determinants for the plurality of carriers.

29. The first communication device of claim 28, wherein the instructions, when executed by the mode selection engine, cause the first communication device to:
select the first mode when the determinants for a threshold quantity of the plurality of carriers are below a determinant threshold.

30. The first communication device of claim 28, wherein the instructions, when executed by the mode selection engine, cause the first communication device to:
determine weighted determinant values based on the determinants for the plurality of carriers in relation to corresponding magnitudes or attenuation associated with the plurality of carriers; and
select the first mode when the weighted determinant values for a threshold quantity of the plurality of carriers are below a weighted determinant threshold.

31. The first communication device of claim 22, wherein the instructions, when executed by the mode selection engine, cause the first communication device to:
determine multiple-input multiple-output (MIMO) beamforming coefficients for a plurality of carriers based on the first signal processing values and second signal processing values; and
select the first mode when the MIMO beamforming coefficients for a threshold quantity of carriers are within a threshold range.

32. A non-transitory machine-readable medium having instructions stored therein, which when executed by a mode selection engine of a processor of a first communication device causes the first communication device to perform operations that comprise:
determining first signal processing values, wherein the first signal processing values are associated with receiving at least a first signal associated with a first subset of a plurality of channels of a powerline medium, and wherein the first subset of the plurality of channels includes a first channel;
determining second signal processing values, wherein the second signal processing values are associated with receiving at least a second signal associated with a second subset of the plurality of channels of the powerline medium, and wherein the second subset of the plurality of channels includes a second channel;
determining whether the powerline medium supports multi-channel communication between the first communication device and a second communication device based at least in part on the first signal processing values and the second signal processing values, wherein determining whether the powerline medium supports the multi-channel communication comprises computing a value based on the first signal processing values and the second signal processing values; and
in response to determining the powerline medium supports the multi-channel communication, selecting a receive mode for the first communication device based at least in part on the computed value being compared to a threshold value, the receive mode selected from a group consisting of a first mode and a second mode, wherein the first mode utilizes only one of the first and second channels, and the second mode utilizes both of the first and second channels.

33. The non-transitory machine-readable medium of claim 32, wherein in response to the receive mode being the first mode, the receive mode is a first single-input single-output (SISO) mode using only one of the first and second channels without receiver diversity, or wherein in response to the receive mode being the second mode, the receive mode is selected from a group consisting of:
a second SISO mode using both of the first and second channels for receiver diversity,
a multiple-input multiple-output (MIMO) eigen-beamforming mode using both of the first and second channels, and
a MIMO spot-beamforming mode using both of the first and second channels.

34. The non-transitory machine-readable medium of claim 32, wherein selecting the receive mode comprises:
selecting the second mode in response to determining that the powerline medium supports the multi-channel communication between the first communication device and the second communication device; and
selecting the first mode in response to determining that the powerline medium does not support the multi-channel communication between the first communication device and the second communication device.

35. A method of receiving signals via a plurality of channels of a powerline medium between the first communication device and a second communication device, the method comprising:
executing instructions stored on a non-transitory machine-readable medium of the first communication device;
estimating a first mode performance associated with single-channel communication via a powerline medium between the first communication device and the second communication device, wherein the single-channel communication enables a first receiver of the first communication device and disables a second receiver of the first communication device;
estimating a second mode performance associated with multi-channel communication via the powerline medium, wherein the multi-channel communication enables the first receiver and the second receiver of the first communication device;
determining whether the powerline medium supports the multi-channel communication based at least in part on the second mode performance, wherein determining whether the powerline medium supports the multi-channel communication comprises computing a value based on the second mode performance; and
in response to determining the powerline medium supports the multi-channel communication, determining, based at least in part on the computed value being compared to a threshold value, whether to use a single-input single-output (SISO) receive mode or a multiple-input multiple-output (MIMO) receive mode.

36. The method of claim 35, wherein the first mode performance comprises a first physical layer (PHY) data rate associated with the SISO receive mode, and the second mode performance comprises a second PHY data rate associated with the MIMO receive mode.

37. The method of claim 36, wherein the first and second PHY data rates are based on signal-to-noise ratio (SNR) measurements at the first receiver and the second receiver.

38. The method of claim 36, wherein the multi-channel communication comprises the MIMO receive mode.

39. The method of claim 35, further comprising:
determining a first signal-to-noise ratio (SNR) value for the first receiver;
determining a second SNR value for the second receiver; and
determining whether to use the SISO receive mode or the MIMO receive mode based on the first and second SNR values.

40. The method of claim 35, further comprising:
determining a first signal-to-noise ratio (SNR) value based on previous SISO transmissions received by the first communication device;
determining a second SNR value based on previous MIMO transmissions received by the first communication device; and
determining whether to use the SISO receive mode or the MIMO receive mode based on the first and second SNR values.

41. The method of claim 35, further comprising:
determining a SISO physical layer (PHY) error rate based at least in part on previous SISO transmissions received by the first communication device;
determining MIMO PHY error rates based at least in part on previous MIMO transmissions received by the first communication device; and
determining whether to use the SISO receive mode or the MIMO receive mode based on the SISO PHY error rate and MIMO PHY error rates.

42. A first communication device, comprising:
a network interface having at least a first receiver and a second receiver;
a processor comprising a mode selection engine; and
a memory storing instructions, which when executed by the mode selection engine, cause the first communication device to:
estimate a first mode performance associated with single-channel communication via a powerline medium between the first communication device and a second communication device;
estimate a second mode performance associated with multi-channel communication via the powerline medium;
determine whether the powerline medium supports the multi-channel communication based at least in part on the second mode performance, wherein determining whether the powerline medium supports the multi-channel communication comprises computing a value based on the second mode performance; and
in response to determining the powerline medium supports the multi-channel communication, determine, based on the computed value being compared to a threshold value, whether to use a single-input single-output (SISO) receive mode or a multiple-input multiple-output (MIMO) receive mode.

43. The first communication device of claim 42, wherein the multi-channel communication comprises the MIMO receive mode.

44. The first communication device of claim 42, wherein the first mode performance comprises a first physical layer (PHY) data rate associated with the SISO receive mode, and the second mode performance comprises a second PHY data rate associated with the MIMO receive mode.

45. The first communication device of claim 44, wherein the first and second PHY data rates are based on signal-to-noise ratio (SNR) measurements at a first receiver and a second receiver.

46. The first communication device of claim 44, wherein the multi-channel communication comprises the MIMO receive mode.

47. The first communication device of claim 42, wherein the instructions, when executed by the mode selection engine, cause the first communication device to:
determine a first signal-to-noise ratio (SNR) value for a first receiver;
determine a second SNR value for a second receiver; and
determine whether to use the SISO receive mode or the MIMO receive mode based on the first and second SNR values.

48. The first communication device of claim 42, wherein the instructions, when executed by the mode selection engine, cause the first communication device to:
determine a first signal-to-noise ratio (SNR) value based on previous SISO transmissions received by the first communication device;
determine a second SNR value based on previous MIMO transmissions received by the first communication device; and
determine whether to use the SISO receive mode or the MIMO receive mode based on the first and second SNR values.

49. The first communication device of claim 42, wherein the instructions, when executed by the mode selection engine, cause the first communication device to:
determine a SISO physical layer (PHY) error rate based at least in part on previous SISO transmissions received by the first communication device;
determine MIMO PHY error rates based at least in part on previous MIMO transmissions received by the first communication device; and
determine whether to use the SISO receive mode or the MIMO receive mode based on the SISO PHY error rate and MIMO PHY error rates.

50. A non-transitory machine-readable medium having instructions stored therein, which when executed by a mode selection engine of a processor of a first communication device causes the first communication device to perform operations that comprise:
estimating a first mode performance associated with single-channel communication via a powerline medium between the first communication device and a second communication device;
estimating a second mode performance associated with multi-channel communication via the powerline medium;
determining whether the powerline medium supports the multi-channel communication based at least in part on the second mode performance, wherein determining whether the powerline medium supports the multi-channel communication comprises computing a value based on the second mode performance; and
in response to determining the powerline medium supports the multi-channel communication, determining, based on the computed value being compared to a threshold value, whether to use a single-input single-output (SISO) receive mode or a multiple-input multiple-output (MIMO) receive mode.

51. The non-transitory machine-readable medium of claim 50, wherein the instructions, when executed by the mode selection engine causes the first communication device to perform further operations that comprise:
- determining a first signal-to-noise ratio (SNR) value for a first receiver;
- determining a second SNR value for a second receiver; and
- determining whether to use the SISO receive mode or the MIMO receive mode based on the first and second SNR values.

52. The non-transitory machine-readable medium of claim 50, wherein the instructions, when executed by the mode selection engine causes the first communication device to perform further operations that comprise:
- determining a first signal-to-noise ratio (SNR) value based on previous SISO transmissions received by the first communication device;
- determining a second SNR value based on previous MIMO transmissions received by the first communication device; and
- determining whether to use the SISO receive mode or the MIMO receive mode based on the first and second SNR values.

53. The non-transitory machine-readable medium of claim 50, wherein the instructions, when executed by the mode selection engine causes the first communication device to perform further operations that comprise:
- determining a SISO physical layer (PHY) error rate based at least in part on previous SISO transmissions received by the first communication device;
- determining MIMO PHY error rates based at least in part on previous MIMO transmissions received by the first communication device; and
- determining whether to use the SISO receive mode or the MIMO receive mode based on the SISO PHY error rate and MIMO PHY error rates.

* * * * *